US012808994B2

(12) United States Patent
Li et al.

(10) Patent No.: US 12,808,994 B2
(45) Date of Patent: Nov. 24, 2026

(54) LIDAR AND LIDAR DESIGN METHOD

(71) Applicant: SUTENG INNOVATION TECHNOLOGY CO., LTD., Shenzhen (CN)

(72) Inventors: Kunyi Li, Shenzhen (CN); Kaipeng Zhang, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 675 days.

(21) Appl. No.: 18/225,657

(22) Filed: Jul. 24, 2023

(65) Prior Publication Data

US 2024/0045031 A1 Feb. 8, 2024

(30) Foreign Application Priority Data

Jul. 29, 2022 (CN) ........................ 202210912376.4

(51) Int. Cl.
*G01S 7/481* (2006.01)
*G01S 17/08* (2006.01)

(52) U.S. Cl.
CPC .......... *G01S 7/4815* (2013.01); *G01S 7/4816* (2013.01); *G01S 17/08* (2013.01)

(58) Field of Classification Search
CPC ....... G01S 7/4815; G01S 7/4816; G01S 17/08
See application file for complete search history.

(56) References Cited

U.S. PATENT DOCUMENTS

2020/0241113 A1* 7/2020 Cullumber ............ G01S 7/4811

FOREIGN PATENT DOCUMENTS

| | | | | | |
|---|---|---|---|---|---|
| CN | 109416399 | A | * | 3/2019 | G01S 17/89 |
| CN | 112234432 | A | * | 1/2021 | H01S 5/4025 |
| CN | 216748063 | A | * | 6/2022 | G01S 7/481 |
| CN | 216748063 | U | | 6/2022 | |

OTHER PUBLICATIONS

First Office Action issued in corresponding Chinese Application No. 202210912376.4, dated Jan. 9, 2025, 12 pages.
Second Office Action issued in corresponding Chinese Application No. 202210912376.4, dated Mar. 13, 2025, 9 pages.

* cited by examiner

*Primary Examiner* — Jamil Ahmed
(74) *Attorney, Agent, or Firm* — BAYES PLLC

(57) ABSTRACT

This application provides a LiDAR and a LiDAR design method. The LiDAR includes at least one laser beam emission module and at least one laser beam receiving module. Each laser beam emission module includes a light emission device and an emission lens, and each laser beam receiving module includes a detection device and a receiving lens. A focal length of an emission lens of the at least one laser beam emission module is set to be less than a first focal length value, so that a total emission angle of view of all laser beam emission modules is greater than a first preset value.

9 Claims, 9 Drawing Sheets

LIDAR AND LIDAR DESIGN METHOD

CROSS-REFERENCE TO RELATED APPLICATION

The present application claims the benefit of priority to Chinese Patent Application No. 202210912376.4, filed on Jul. 29, 2022, which is hereby incorporated by reference in its entirety.

TECHNICAL FIELD

This application pertains to the technical field of laser ranging, and in particular, relates to a LiDAR and a LiDAR design method.

BACKGROUND

A LiDAR is a radar system that emits a laser beam to detect characteristics such as the position or speed of a target. The LiDAR generally includes an emission module, a receiving module, and a signal processing apparatus. The LiDAR includes at least one group of emission modules. A light source in the emission module emits a detection laser beam to a target object, the receiving module receives an echo laser beam reflected by the target object and outputs a corresponding electrical signal, and after the signal processing apparatus processes the electrical signal, distance, azimuth, height, speed, attitude, shape, and other parameters of the target object are obtained, thereby implementing a detection function.

Currently, in related technologies, the emission angle of view of the emission module and the receiving angle of view of the receiving module are relatively small, which cannot meet the requirement for the LiDAR to detect a large field of view.

SUMMARY

This application aims to provide a LiDAR and a LiDAR design method, to meet the requirement for the LiDAR to detect a large field of view.

A first aspect of this application provides a LiDAR, including at least one laser beam emission module and at least one laser beam receiving module, where each laser beam emission module includes a light emission device and an emission lens, the emission lens is on a light outgoing side of the light emission device, each laser beam receiving module includes a detection device and a receiving lens, and the receiving lens is on a light incident side of the detection device, where a focal length of an emission lens of the at least one laser beam emission module is set to be less than a first focal length value, so that a total emission angle of view of all laser beam emission modules is greater than a first preset value; and/or a focal length of a receiving lens of the at least one laser beam receiving module is set to be less than a second focal length value, so that a total receiving angle of view of all laser beam receiving modules is greater than a second preset value.

A second aspect of this application provides a LiDAR design method, including a step for designing a laser beam emission module, where the step for designing a laser beam emission module includes: selecting a light emission device based on a required total emission angle of view; and setting a focal length of at least one emission lens to be less than a first focal length value based on the required total emission angle of view and the selected light emission device, so that a total emission angle of view of at least one laser beam emission module is greater than a first preset value; and/or the LiDAR design method includes a step for designing a laser beam receiving module, where the step for designing a laser beam receiving module includes: selecting a detection device based on a required total receiving angle of view; and setting a focal length of at least one receiving lens to be less than a second focal length value based on the required total receiving angle of view and the selected light detection device, so that a total receiving angle of view of at least one laser beam receiving module is greater than a second preset value.

Based on the LiDAR and the LiDAR design method provided in this application, the focal length of the emission lens is reduced to enlarge the emission angle of view of the laser beam emission module, and the focal length of the receiving lens is reduced to enlarge the receiving angle of view of the laser beam receiving module, thereby enlarging the detection field of view of the LiDAR and meeting the requirement for the LiDAR to detect the large field of view.

BRIEF DESCRIPTION OF DRAWINGS

To explain the technical solution in embodiments in this application more clearly, the following briefly introduces the accompanying drawings. Obviously, the accompanying drawings in the following description are only some embodiments in this application.

DESCRIPTION OF REFERENCE SIGNS

Figure 1:
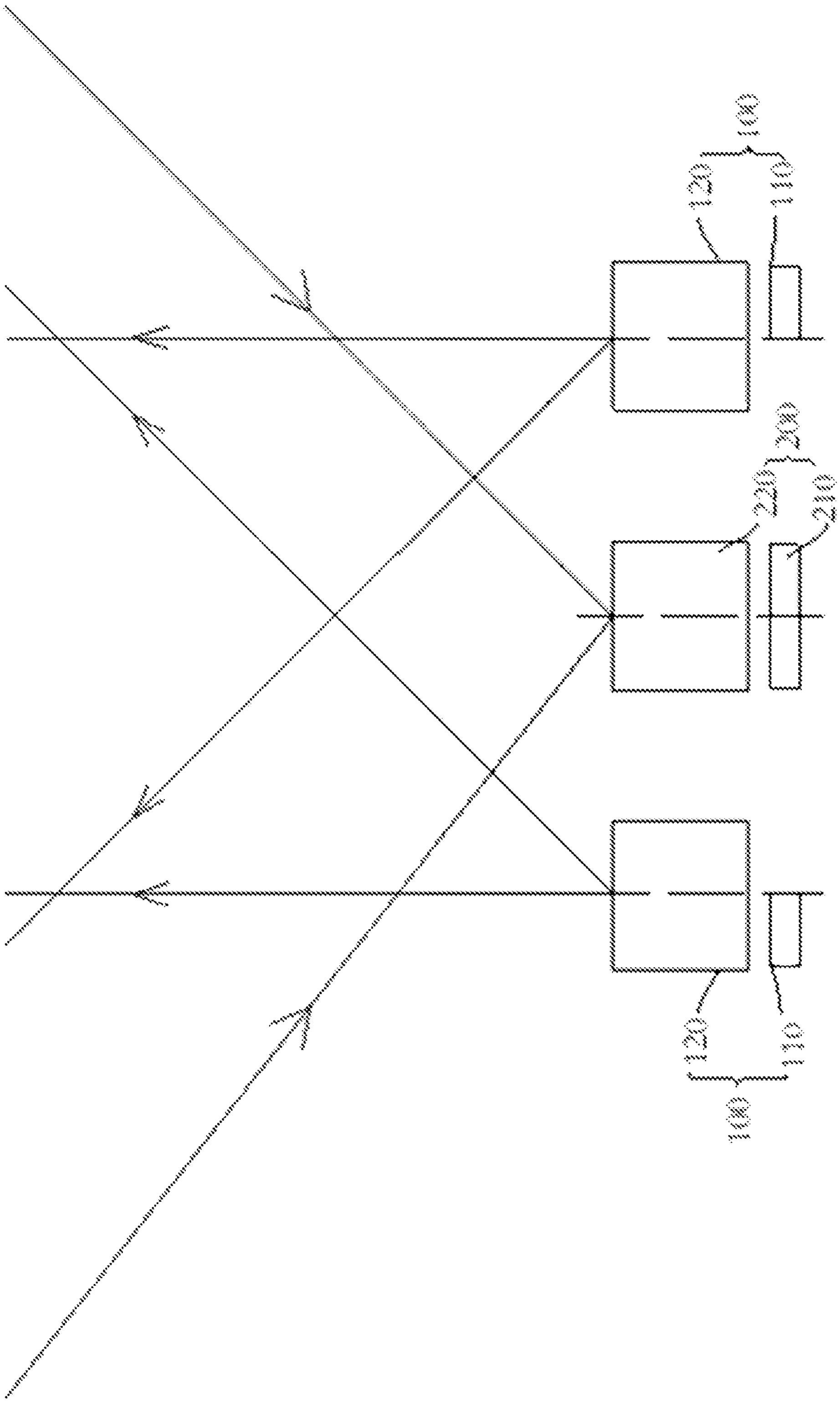
FIG. 1 is a schematic structural diagram of a LiDAR according to some embodiments of this application.

100—emission module; 110—light emission device; 111—light emission unit; 120—emission lens; 121—first lens; 122—second lens; 123—third lens; 124—fourth lens; 130—refractive optical structure; 131—refraction portion; 200—receiving module; 210—detection device; 220—receiving lens; 221—fifth lens; 222—sixth lens; 223—seventh lens; 224—eighth lens; and 225—ninth lens.

DETAILED DESCRIPTION

The embodiments of this application are described in detail below. Examples of the embodiments are shown in the accompanying drawings, and the same or similar reference signs indicate the same or similar elements or elements with the same or similar functions. The embodiments described below with reference to the accompanying drawings are exemplary and intended to explain this application, but cannot be construed as a limitation on this application.

In the description of this application, it should be understood that azimuth or position relationships indicated by terms such as "vertical" and "horizontal" are based on the azimuth or position relationships shown in the accompanying drawings, are merely intended to describe this application and simplify the descriptions, but are not intended to indicate or imply that the specified device or element shall have specific azimuth or be formed and operated in specific azimuth, and therefore cannot be understood as a limitation on this application.

In addition, the terms such as "first" and "second" are merely intended for a purpose of description, and shall not be understood as an indication or implication of relative importance or implicit indication of a quantity of indicated technical features. Therefore, a feature with a determiner such as "first" or "second" may expressly or implicitly include one or more features. In the description of this application, "multiple" means two or more, unless otherwise specifically defined.

To make the objectives, technical solutions, and advantages of this application more comprehensible, the following further describes this application in detail with reference to accompanying drawings and embodiments.

In a first aspect, referring to FIG. 1 to FIG. 6, this application provides a LiDAR, including at least one laser beam emission module 100 and at least one laser beam receiving module 200. Each laser beam emission module 100 includes a light emission device 110 and an emission lens 120. The light emission device 110 is configured to emit multiple laser beams, and the emission lens 120 is on a light outgoing side of the light emission device 110, and is configured to: receive multiple laser beams emitted by the light emission device 110, and emit an outgoing beam to a target object in an emission angle of view of the laser beam emission module 100; and each laser beam receiving module 200 includes a detection device 210 and a receiving lens 220, and the receiving lens 220 is on a light incident side of the detection device 210, and is configured to: receive an echo laser beam reflected by a target object in a receiving angle of view of the laser beam receiving module 200, and focus the echo laser beam on the detection device 210. A detection region covered by a total emission angle of view of all laser beam emission modules 100 included in the LiDAR at least partially overlaps with a detection region covered by a total receiving angle of view of all laser beam receiving modules 200, so that an echo laser beam reflected by the target object can be received by the laser beam receiving module 200 when the laser beam emission module 100 emits an outgoing beam to a target object in an overlapped detection region.

The detection region covered by the total emission angle of view of all the laser beam emission modules 100 matches the detection region covered by the total receiving angle of view of all the laser beam receiving modules 200, so that each echo laser beam reflected by the target object can be received by the laser beam receiving module 200 when the laser beam emission module 100 emits an outgoing beam to a target object in the detection region. The LiDAR in some embodiments may be a solid-state LiDAR, which is used for functions such as navigation, obstacle avoidance, obstacle recognition, ranging, speed measurement, and automated driving of products such as an automobile, a robot, a transport vehicle, and a patrol vehicle.

In some embodiments, when the LiDAR includes only one laser beam emission module 100, a dimension of a light emission surface of the light emission device 110 of the laser beam emission module 100 is $H_1$, a focal length of the emission lens 120 is $f_1$, and an emission angle of view of the laser beam emission module 100 is $\theta_1$ (in radians), the emission angle of view $\theta_1$ of the laser beam emission module 100, the dimension $H_1$ of the light emission surface of the light emission device 110 and the focal length $f_1$ of the emission lens 120 satisfy a formula (1):

$$H=f^*\theta \tag{1}$$

That is, $H_1=f_1{}^*\theta_1$, the emission angle of view $\theta_1$ of the laser beam emission module 100 satisfies $\theta_1=H_1/f_1$; that is, an emission angle of view (in radians) of each laser beam emission module 100 is inversely proportional to the focal length $f_1$ of the emission lens 120. When a dimension $H_1$ of the light emission device 110 remains unchanged, the laser beam emission module 100 sets the focal length $f_1$ of the emission lens 120 to be less than the first focal length value, so that the emission angle of view $\theta_1$ of the laser beam emission module 100 is greater than the first preset value. That is, for the laser beam emission module 100, the focal length $f_1$ of the emission lens 120 in the laser beam emission module 100 is reduced, to enlarge the emission angle of view $\theta_1$ of the laser beam emission module 100. In addition, the laser beam emission module 100 provided in this application uses an emission lens 120 with a smaller focal length to enlarge the emission angle of view, instead of increasing the dimension of the light emission device 110 to enlarge the emission angle of view, thereby avoiding problems such as an increase in emission power of the light emission device 110, non-uniformity of light emission, difficulty in driving hardware of the light emission device 110, and an increase in manufacturing costs that are caused by an increase in the dimension of the light emission device 110.

In some embodiments, the first preset value is 90°×30°, and when the dimension of the light emission device 110 remains unchanged, the laser beam emission module 100 reduces a focal length of the emission lens 120, so that the emission angle of view can be equal to 120°×40°. Herein, 90° and 120° are horizontal emission angles of view, and 30° and 40° are vertical emission angles of view.

Figure 2B:
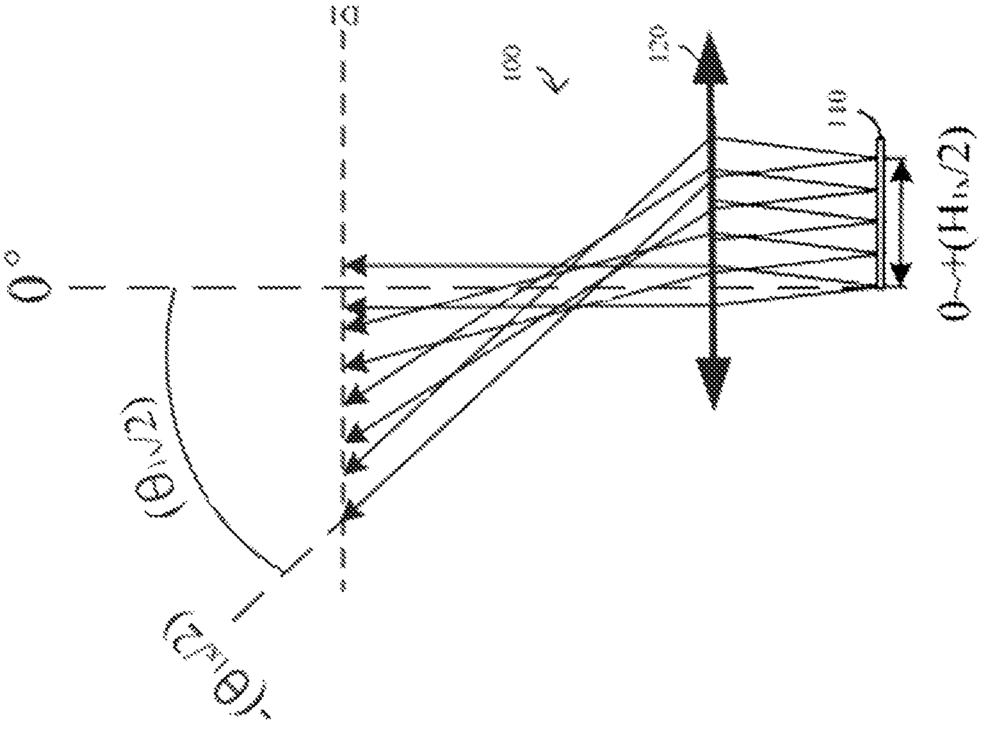
FIGS. 2*a*-2*b* are schematic diagrams of an optical path of a laser beam emission module used in a LiDAR according to some embodiments of this application.
Figure 2A:
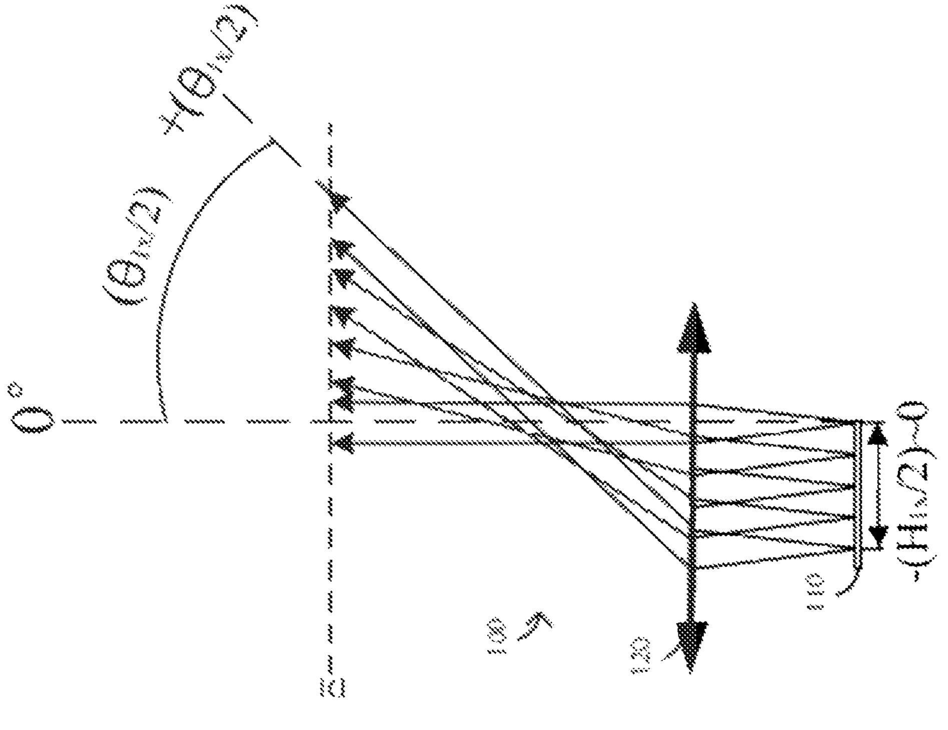

As shown in FIGS. 2*a* and 2*b*, in some embodiments, when the LiDAR includes only one laser beam emission module 100, the light emission device 110 of the laser beam emission module 100 includes multiple light emission units 111 that are arranged at intervals along the horizontal direction and the vertical direction and that are configured to emit multiple laser beams. Correspondingly, a total emission angle of view corresponding to the laser beam emission module 100 covers specific angle ranges along the horizontal direction and the vertical direction. The angles of view covered by the total emission angle of view corresponding to the laser beam emission module 100 along the horizontal direction and the vertical direction are respectively a horizontal emission angle of view $\theta_{1x}$ and a vertical emission angle of view $\theta_{1y}$. In this case, a dimension $H_{1x}$ of the total light emission surface of the light emission device 110 of the laser beam emission module 100 along the horizontal direction, the focal length $f_1$ of the emission lens 120 and the horizontal emission angle of view $\theta_{1x}$ (in radians) of the laser beam emission module 100 also satisfy the formula (1): $\theta_{1x}=H_{1x}/f_1$; and a dimension $H_{1y}$ of a total light emission surface of the light emission device 110 of the laser beam emission module 100 along the vertical direction, the focal length $f_1$ of the emission lens 120 and the vertical emission angle of view $\theta_{1y}$ (in radians) of the laser beam emission module 100 also satisfy the formula (1): $\theta_{1y}=H_{1y}/f_1$.

For the laser beam emission module 100, the horizontal emission angle of view $\theta_{1x}$ and the vertical emission angle of view $\theta_{1y}$ of the laser beam emission module 100 are negatively correlated with the focal length $f_1$ of the emission lens 120. When a dimension $H_1$ of a total light emission surface of light emission devices 110 corresponding to all the laser beam emission modules 100 remains unchanged, that is, a dimension $H_{1x}$ of a total light emission surface of the light emission devices 110 corresponding to all the laser beam emission modules 100 along the horizontal direction and a dimension $H_{1y}$ of the total light emission surface thereof along the vertical direction remain unchanged, the laser beam emission module 100 sets the focal length $f_1$ of the emission lens 120 to be less than the first focal length value, so that the horizontal emission angle of view $\theta_{1x}$ of the laser beam emission module 100 is greater than the first horizontal preset value, and the vertical emission angle of view $\theta_{1y}$ of the laser beam emission module 100 is greater than the first vertical preset value. That is, the focal length $f_1$ of the emission lens 120 in the laser beam emission module 100 is reduced, to enlarge the horizontal emission angle of view $\theta_{1x}$ and the vertical emission angle of view $\theta_{1y}$ of the laser beam emission module 100, so that the horizontal emission angle of view $\theta_{1x}$ of the laser beam emission module 100 is greater than the first horizontal preset value and the vertical emission angle of view $\theta_{1y}$ of the laser beam emission module 100 is greater than the first vertical preset value.

In the LiDAR provided in this application, the focal length $f_1$ of the emission lens 120 in the laser beam emission module 100 is reduced, to enlarge the horizontal emission angle of view $\theta_{1x}$ and the vertical emission angle of view $\theta_{1y}$ of the laser beam emission module 100, so that the horizontal emission angle of view $\theta_{1x}$ of the laser beam emission module 100 is greater than the first horizontal preset value, and the vertical emission angle of view $\theta_{1y}$ is greater than the first vertical preset value. In addition, the LiDAR provided in this application uses an emission lens 120 with a smaller focal length to enlarge the horizontal emission angle of view $\theta_{1x}$ and the vertical emission angle of view $\theta_{1y}$, instead of increasing a dimension of the light emission device 110 along a corresponding direction to enlarge the horizontal emission angle of view $\theta_{1x}$ and the vertical emission angle of view $\theta_{1y}$, thereby avoiding problems such as an increase in emission power of the light emission device 110, non-uniformity of light emission, difficulty in driving hardware of the light emission device 110, and an increase in manufacturing costs that are caused by an increase in the dimension of the light emission device 110.

In an example, the first preset value is 90°*30°, the first horizontal preset value is 90°, and the first vertical preset value is 30°. When the first preset value is 90°×30°, in some embodiments, when the laser beam emission module 100 of the LiDAR is designed, simulation software can be first used to design a laser beam emission module 100 with the emission angle of view of 90°×30°, and then an optical parameter of at least one lens in the emission lens 120 is adjusted, to reduce the focal length of the emission lens 120, thereby enlarging the emission angle of view of the laser beam emission module 100.

In some embodiments, the total emission angle of view of all laser beam emission modules 100 in the LiDAR is 120°×40°, that is, the horizontal emission angle of view $\theta_{1x}$ is 120° (2π/3 radians), and the vertical emission angle of view $\theta_{1y}$ is 40° (2π/9 radians), that is, in the LiDAR, the dimension $H_{1x}$ of the total light emission surface of the light emission devices 110 in all the laser beam emission modules 100 along the horizontal direction and the dimension $H_{1y}$ of the total light emission surface thereof along the vertical direction satisfy: $H_{1x}/H_{1y}=(2\pi/3)/(2\pi/9)=3$. In addition, the dimension $H_{1x}$ of the total light emission surface of the light emission devices 110 in all the laser beam emission modules 100 along the horizontal direction and the dimension $H_{1y}$ of the total light emission surface thereof along the vertical direction, and the focal length $f_1$ of the emission lens 120 in the laser beam emission module 100 satisfy: $2\pi/3=H_{1x}/f_1$, and $2\pi/9=H_{1y}/f_1$.

In some embodiments, the LiDAR includes multiple laser beam emission modules 100, and the emission angle of view of the LiDAR includes the total emission angle of view of all the laser beam emission modules 100, that is, a combined emission angle of view of the multiple laser beam emission modules 100. A focal length of an emission lens 120 corresponding to any one or more of laser beam emission modules 100 is reduced, so that the emission angle of view of the corresponding laser beam emission module 100 can be enlarged, thereby enlarging the total emission angle of view of all the laser beam emission modules 100.

Further, the LiDAR includes M laser beam emission modules 100, M is a positive integer greater than or equal to 2, and emission lenses 120 of the M laser beam emission modules 100 have the same structure and a focal length of $f_1$. The emission lens 120 of each laser beam emission module 100 includes a first optical axis 120', and first optical axes 120' of the emission lenses 120 of the multiple laser beam emission modules 100 are parallel to each other. When first optical axes 120' of emission lenses 120 of two adjacent laser beam emission modules 100 are aligned along an axial direction of the first optical axis, light emission surfaces of the light emission devices 110 of the two adjacent laser beam emission modules 100 cover different regions along the first direction, and when the light emission surfaces of the light emission devices 110 of the two adjacent laser beam emission modules 100 abut on or overlap with each other along the first direction, the multiple laser beam emission modules 100 along the first direction satisfy: $f_1=(H_{1-1}/\theta_{1-1})$, where $H_1$, is the dimension of the total light emission surface along the first direction that is obtained by combining the light emission surfaces of the light emission devices 110 of all the laser beam emission modules 100, the first direction can be the horizontal direction, and in this case, $H_{1-1}=H_{1x}$, and $\theta_{1-1}=\theta_{1x}$; or the first direction is the vertical direction, and in this case, $H_{1-1}=H_{1y}$, and $\theta_{1-1}=\theta_{1y}$. When first optical axes of emission lenses 120 of two adjacent laser beam emission modules 100 are aligned along an axial direction of the first optical axis, light emission surfaces of the light emission devices 110 of the two adjacent laser beam emission modules 100 cover the same region along the second direction, and the multiple laser beam emission modules 100 along the second direction satisfy: $f_1=(H_{1-2}/\theta_{1-2})$, where the second direction can be the vertical direction, and in this case, $H_{1-2}=H_{1y}$ ($H_{1y}$ is the dimension of the combined total light emission surface of the light emission devices 110 of all the laser beam emission modules 100 along the vertical direction, that is, a dimension of the light emission device 110 of any one laser beam emission module 100 along the vertical direction), and $\theta_{1-2}=\theta_{1y}$; or the second direction is the horizontal direction, $H_{1-2}=H_{1x}$ ($H_{1x}$ is the dimension of the combined total light emission surface of the light emission devices 110 of all the laser beam emission modules 100 along the horizontal direction, that is, a dimension of the light emission device 110 of any one laser beam emission module 100 along the horizontal direction), and $\theta_{1-2}=\theta_{1x}$. In some embodiments, the first direction is the horizontal direction, and the second direction is the vertical direction.

In some embodiments, dimensions of light emission surfaces of the light emission devices 110 corresponding to the M laser beam emission modules 100 along the horizontal direction are all equal to $H_{1x}/M$, where a position range covered by a light emission device 110 corresponding to a first laser beam emission module 100 along the horizontal direction is $[+(H_{1x}/2)]$ to $[(H_{1x}/2)-(H_{1x}/M)]$, a position range covered by a light emission device 110 corresponding to an $m^{th}$ laser beam emission module 100 is $[(H_{1x}/2)-(m-1)(H_{1x}/M)]$ to $[(H_{1x}/2)-m*(H_{1x}/M)]$, and a position range covered by a light emission device 110 corresponding to an $M^{th}$ laser beam emission module 100 is $[-(H_{1x}/2)+(H_{1x}/M)]$ to $[-(H_{1x}/2)]$. Based on a formula (1) and a lens imaging principle, a range of an emission angle covered by the light emission device 110 corresponding to the first laser beam emission module 100 along the horizontal direction is $[-(\theta_{1x}/2)]$ to $[-(\theta_{1x}/2)+(\theta_{1x}/M)]$, the position range covered by the light emission device 110 corresponding to the $m^{th}$ laser beam emission module 100 is $[-(\theta_{1x}/2)+(m-1)*(\theta_{1x}/M)]$ to $[-(\theta_{1x}/2)+m*(\theta_{1x}/M)]$, and the position range covered by the light emission device 110 corresponding to the $M^{th}$ laser beam emission module 100 is $[+(\theta_{1x}/2)-(\theta_{1x}/M)]$ to $[+(\theta_{1x}/2)]$. In this case, a combined dimension of light emission surfaces of the light emission devices 110 corresponding to the M laser beam emission modules 100 along the horizontal direction is $[-(H_{1x}/2)]$ to $[+(H_{1x}/2)]$, and a range of an angle covered by a horizontal emission angle of view is $[-(\theta_{1x}/2)]$ to $[+(\theta_{1x}/2)]$, where $\theta_{1x}=H_{1x}/f_1$, and $\theta_{1x}$ is negatively correlated with the focal length $f_1$ of the emission lens 120. In addition, the light emission surfaces of the light emission devices 110 corresponding to the M laser beam emission modules 100 along the vertical direction cover the same region. For example, ranges of the positions covered by the light emission surfaces of the light emission devices 110 corresponding to the M laser beam emission modules 100 along the vertical direction are all $[-(H_{1y}/2)]$ to $[+(H_{1y}/2)]$. In this case, a combined dimension of the light emission surfaces of the light emission devices 110 corresponding to the M laser beam emission modules 100 along the vertical direction is $H_{1y}$, a combined emission angle of view $\theta_{1y}$ of the M laser beam emission modules 100 along the vertical direction satisfies $\theta_{1y}=H_{1y}/f_1$, and $\theta_{1y}$ is negatively correlated with the focal length $f_1$ of the emission lens 120.

In some embodiments, dimensions of light emission surfaces of the light emission devices 110 corresponding to the M laser beam emission modules 100 along the horizontal direction may not be completely equal, provided that a combined dimension of the light emission surfaces is $H_{1x}*H_{1y}$. The emission angle of view of an $m^{th}$ laser beam emission module 100 includes a horizontal emission angle of view $\theta_{1mx}$ and a vertical emission angle of view $\theta_{1my}$. A dimension $H_{1mx}$ of a light emission surface of a light emission device 110 of the laser beam emission module 100 along the horizontal direction, the focal length $f_1$ of the emission lens 120 and an emission angle of view $\theta_{1mx}$ (in radians) of the laser beam emission module 100 along the horizontal direction also satisfy a formula (1): $\theta_{1mx}=H_{1mx}/f_1$; and therefore, $(\theta_{11x}+\ldots\theta_{1mx}\ldots+\theta_{1Mx})=(H_{11x}+\ldots H_{1mx}\ldots+H_{1Mx})/f_1$, where $H_{11x}+\ldots H_{1mx}\ldots+H_{1Mx}$ is a combination $H_{1x}$ of dimensions of light emission surfaces of M laser beam emission modules 100; and $\theta_{11x}+\ldots\theta_{1mx}\ldots+\theta_{1Mx}$ is a combination $\theta_{1x}$ of emission angles of view of the M laser beam emission modules 100 along the horizontal direction. A combined dimension $H_{1y}$ of the light emission surfaces of the light emission devices 110 of the M laser beam emission modules 100 along the vertical direction, the focal length $f_1$ of the emission lens 120, and the emission angle of view $\theta_{1y}$ (in radians) of the laser beam emission module 100 along the vertical direction also satisfy a formula (1): $\theta_{1y}=H_{1y}/f_1$.

In some embodiments, focal lengths $f_1$ of the emission lenses 120 in all the laser beam emission modules 100 are reduced until the focal lengths $f_1$ are less than the first focal length value, to enlarge a combined horizontal emission angle of view $\theta_{1x}$ and vertical emission angle of view $\theta_{1y}$ of the multiple laser beam emission modules 100, so that the combined horizontal emission angle of view $\theta_{1x}$ of the multiple laser beam emission modules 100 is greater than the first horizontal preset value, and the vertical emission angle of view $\theta_{1y}$ is greater than the first vertical preset value. In addition, the LiDAR provided in this application uses an emission lens 120 with a smaller focal length to enlarge the horizontal emission angle of view $\theta_{1x}$ and the vertical emission angle of view $\theta_{1y}$, instead of increasing a dimension of the light emission device 110 along a corresponding direction to enlarge the horizontal emission angle of view $\theta_{1x}$ and the vertical emission angle of view $\theta_{1y}$, thereby avoiding problems such as an increase in emission power of the light emission device 110, non-uniformity of light emission, difficulty in driving hardware of the light emission device 110, and an increase in manufacturing costs that are caused by an increase in the dimension of the light emission device 110.

Further, in the LiDAR provided in this application, on the premise that the focal lengths $f_1$ of the emission lenses 120 in the multiple laser beam emission modules 100 are reduced, and the total horizontal emission angle of view $\theta_{1x}$ and the total vertical emission angle of view $\theta_{1y}$ of all the laser beam emission modules 100 are enlarged, combining horizontal emission angles of view of the multiple laser beam emission modules 100 can reduce a dimension of the light emission surface required for the light emission device 110 used in a single laser beam emission module 100 along the horizontal direction, and further reduce a dimension of the light emission device 110 used in the single laser beam emission module 100, which can effectively reduce power and costs of the single laser beam emission module 100, and can also facilitate driving operation of related hardware, thereby facilitating adjustment of a position and a luminous effect of the single laser beam emission module 100 and more easily ensuring uniform distribution of light emitted by the laser beam emission module 100. In some embodiments, the LiDAR can also enlarge the total horizontal emission angle of view $\theta_{1x}$ and the total vertical emission angle of view $\theta_{1y}$ of all the laser beam emission modules 100 by reducing a focal length $f_1$ of an emission lens 120 in at least one of the multiple laser beam emission modules 100.

Further, combining horizontal emission angle of views of the multiple laser beam emission modules 100 can reduce the dimension of the light emission device 110 used by a single laser beam emission module 100 along the horizontal direction, to further properly enlarge the dimension of the light emission device 110 along the horizontal direction and obtain a larger horizontal emission angle of view.

As shown in FIG. 1, in some embodiments, M=2, that is, the LiDAR includes two laser beam emission modules 100; and the LiDAR further includes one laser beam receiving module 200. The two laser beam emission modules 100 are on two sides of one laser beam receiving module 200, and a combined emission angle of view of the two laser beam emission modules 100 matches the receiving field of view of the laser beam receiving module 200. If the combined emission angle of view of the two laser beam emission modules 100 matches the receiving field of view of the laser beam receiving module 200, this indicates that a total emission angle of view of the two laser beam emission modules 100 is equal to the receiving angle of view of the laser beam receiving module 200.

Figure 3:
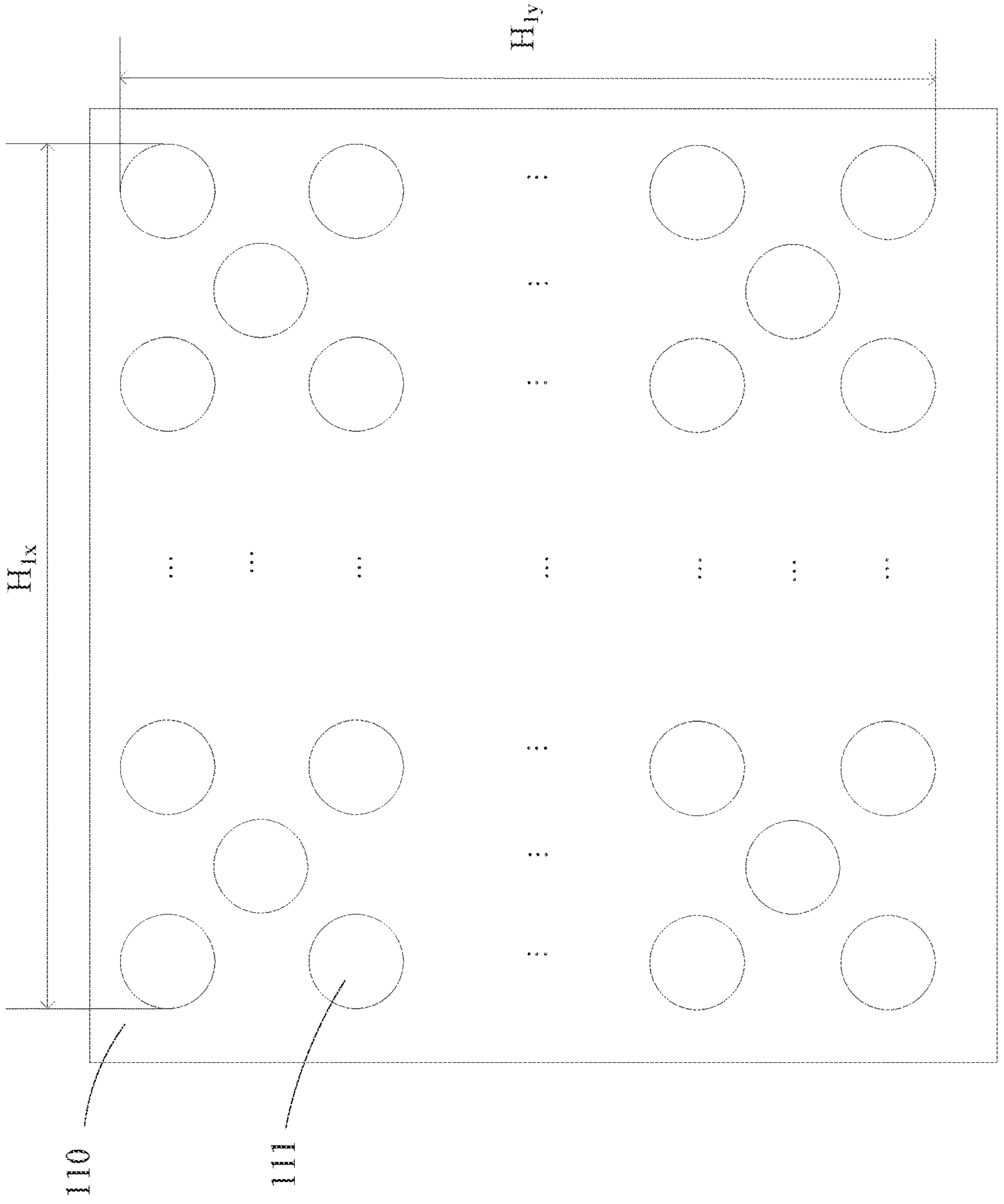
FIG. 3 is a schematic diagram of an arrangement of a light emission unit in a light emission device used according to some embodiments of this application.

In some embodiments, the emission lenses 120 of the two laser beam emission modules 100 have the same structure and the same focal length $f_1$. The emission lenses 120 of the two laser beam emission modules 100 each have a first optical axis 120', and first optical axes 120' of the emission lens 120 of the two laser beam emission modules 100 are parallel to each other. Along the horizontal direction perpendicular to the first optical axis 120', a coverage range of a dimension of a light emission device 110 of one laser beam emission module 100 is $-(H_{1x}/2)$ to 0, and correspondingly, a coverage range of the horizontal emission angle of view of the laser beam emission module 100 is 0 to $+(\theta_{1x}/2)$; and a coverage range of a dimension of the light emission device 110 of another laser beam emission module 100 is 0 to $+(H_{1x}/2)$, and correspondingly, a coverage range of the horizontal emission angle of view of the laser beam emission module 100 is $-(\theta_{1x}/2)$ to 0 (as shown in FIG. 3). That is, a combined dimension of the light emission surfaces of the light emission devices 110 of the two laser beam emission modules 100 along the horizontal direction is $H_{1x}$, and correspondingly, a combined horizontal emission angle of view of the two laser beam emission modules 100 is $\theta_{1x}$. Along a vertical direction perpendicular to the first optical axis 120', coverage ranges of dimensions of the light emission devices 110 of the two laser beam emission modules 100 are both $-(H_{1y}/2)$ to $+(H_{1y}/2)$, and correspondingly, coverage ranges of vertical emission angles of view of the two laser beam emission modules 100 are $-(\theta_{1y}/2)$ to $+(\theta_{1y}/2)$. That is, a combined dimension of the light emission surfaces of the light emission devices 110 of the two laser beam emission modules 100 along the vertical direction is $H_{1y}$, and correspondingly, a combined vertical emission angle of view of the two laser beam emission modules 100 is $\theta_{1y}$. That is, a combined dimension of the light emission surfaces of the light emission devices 110 of the two laser beam emission modules 100 is $H_{1x}*H_{1y}$, and correspondingly, a combined horizontal emission angle of view of the two laser beam emission modules is $\theta_{1x}*\theta_{1y}$.

In some embodiments, the LiDAR uses two laser beam emission modules 100 with the same structure. During assembly, one laser beam emission module 100 only needs to be rotated around the direction of the first optical axis 120' by 180 degrees. Along the horizontal direction, the coverage ranges of the dimensions of the light emission devices 110 of the two laser beam emission modules 100 are respectively $-(H_{1x}/2)$ to 0 and 0 to $+(H_{1x}/2)$, and along the vertical direction, coverage ranges of dimensions of the light emission devices 110 of the two laser beam emission modules 100 are both $-(H_{1y}/2)$ to $+(H_{1y}/2)$. Correspondingly, a combined dimension of the light emission surfaces of the two laser beam emission modules 100 along the horizontal direction is $H_{1x}$, and a combined horizontal emission angle of view of the two laser beam emission modules 100 is $\theta_{1x}$. A combined dimension of the light emission surfaces of the light emission devices 110 of the two laser beam emission modules 100 along the vertical direction is $H_{1y}$, and correspondingly, a combined vertical emission angle of view of the two laser beam emission modules 100 is $\theta_{1y}$, thereby achieving a simple structure and easy assembly.

As shown in FIG. 1, in some embodiments, dimensions of the light emission surfaces of the light emission devices 110 of the two laser beam emission modules 100 are equal, dimensions $H_{1x}/2$ in the horizontal direction are equal and dimensions $H_{1y}$ in the vertical direction are equal. The focal lengths of the emission lenses 120 of the two laser beam emission modules 100 are also equal to $f_1$. The emission lenses 120 of the two laser beam emission modules 100 each have a first optical axis 120', and the light emission devices 110 of the two laser beam emission modules 100 each are on a side of the first optical axes 120' of their respective emission lenses 120 that is farther away from the laser beam receiving module 200 along the horizontal direction, so that outgoing beams emitted by the two laser beam emission modules 100 along the horizontal direction are directed toward a direction of approaching the laser beam receiving module 200, and the emission angles of view of the two laser beam emission modules 100 overlap with each other, which can ensure that there is always a point cloud in the central field of view of the laser beam receiving module 200 even if there is a pixel offset when the LiDAR performs short-range measurement, thereby effectively avoiding a lack of the point cloud in the central field of view when the LiDAR performs the short-range measurement.

In some embodiments, the light emission devices 110 of the two laser beam emission modules 100 each are on a side of the first optical axes 120' of their respective emission lenses 120 that is closer to the laser beam receiving module 200 along the horizontal direction, so that outgoing beams emitted by the two laser beam emission modules 100 along the horizontal direction are directed toward a direction of leaving the laser beam receiving module 200; and the light emission devices 110 of the two laser beam emission modules 100 are respectively on two sides of the first optical axes 120' of their respective emission lenses 120 along the vertical direction.

Coverage ranges of the light emission surfaces of the light emission devices 110 of the two laser beam emission modules 100 along the horizontal direction are respectively $-(H_{1x}/2)$ to 0 and 0 to $+(H_{1x}/2)$, emission angles of view of the two laser beam emission modules 100 along the horizontal direction are respectively 0 to $+(\theta_{1x}/2)$ and $-(\theta_{1x}/2)$ to 0, and a combined emission angle of view of the two laser beam emission modules 100 along the horizontal direction is $-(\theta_{1x}/2)$ to $+(\theta_{1x}/2)$; and coverage ranges of the light emission surfaces of the light emission devices 110 of the two laser beam emission modules 100 along the vertical direction both are $-(H_{1y}/2)$ to $+(H_{1y}/2)$, emission angles of view of the two laser beam emission modules 100 along the vertical direction both are $-(\theta_{1y}/2)$ to $+(\theta_{1y}/2)$, a combined emission angle of view of the two laser beam emission modules 100 along the vertical direction is still $-(\theta_{1y}/2)$ to $+(\theta_{1y}/2)$, and therefore, a combined emission angle of view of the two laser beam emission modules 100 is $[-(\theta_{1x}/2)$ to $+(\theta_{1x}/2)]*[-(\theta_{1y}/2)$ to $+(\theta_{1y}/2)]$.

In some embodiments, a VCSEL (Vertical-Cavity Surface-Emitting Laser) is used as the light emission device 110, and each VCSEL includes 72 single-point emitters horizontally and 48 single-point emitters vertically, and can emit 72*48 laser beams. 72*48 outgoing beams emitted by each of the two laser beam emission modules 100 are spliced into 144*48 single-point optical paths; and after multiple laser beams emitted by the light emission devices 110 corresponding to the two laser beam emission modules 100 are processed by the emission lens 120, horizontal emission angles of view are −60° to 0° and 0° to +60° respectively, and the vertical emission angles of view are both −20° to +20°. A detection angle of view covered by multiple outgoing beams emitted by each laser beam emission module 100 is equal to 60°*40°, and the two laser beam emission modules 100 form an angle of view of 120×40°. The laser beam receiving module 200 has a horizontal receiving angle of view of −60° to +60°, and a vertical receiving angle of view of −20° to 20°, that is, the receiving angle of view of the laser beam receiving module 200 is 120×40°, and matches a combined emission angle of view of the two laser beam emission modules 100.

In some embodiments, the emission lens 120 includes an angle narrowing assembly and a beam expanding assembly arranged sequentially along an emission optical path of the laser beam emission module 100, and the angle narrowing assembly has positive optical power, includes at least one lens and is configured to perform angle narrowing processing on a laser beam emitted by the light emission device 110, to narrow a divergence angle of the laser beam emitted by the light emission device 110; and the beam expanding assembly has negative optical power, includes at least one lens and is configured to perform beam expanding processing on a laser beam subjected to divergence angle narrowing processing, to expand an angle of view of the laser beam subjected to the divergence angle narrowing processing. The emission lens 120 also satisfies: $f_1=(f_{11}*f_{12})/(f_{11}+f_{12}-d_1)$, where $f_{11}$ is a focal length of the at least one lens included in the angle narrowing assembly, $f_{12}$ is a focal length of the at least one lens included in the beam expanding assembly, and $d_1$ is a distance between optical centers of the angle narrowing assembly and the beam expanding assembly.

In some embodiments, the angle narrowing assembly uses a collimating lens, and the beam expanding assembly uses a beam expanding lens, thereby achieving a simple structure.

Further, a divergence angle narrowing degree of the laser beam emitted by the light emission device 110 can be adjusted by the angle narrowing assembly, so that a state of a light spot formed by an outgoing beam in the detection region that is emitted by the emission lens 120 can be adjusted. For example, when the angle narrowing assembly performs the first divergence angle narrowing processing on the laser beams emitted by the light emission device 110, light spots formed by the outgoing beams in the detection region that are emitted by the emission lens 120 are in a state where adjacent light spots are arranged at intervals. When the angle narrowing assembly performs the second divergence angle narrowing processing on the laser beams emitted by the light emission device 110, light spots formed by the outgoing beams in the detection region that are emitted by the emission lens 120 are in a state where adjacent light spots abut on each other. When the angle narrowing assembly performs the third divergence angle narrowing processing on the laser beams emitted by the light emission device 110, light spots formed by the outgoing beams in the detection region that are emitted by the emission lens 120 are in a state where adjacent light spots overlap with each other. A divergence angle narrowing degree of the laser beam that is subjected to the first divergence angle narrowing processing and that is emitted by the light emission device 110 is greater than a divergence angle narrowing degree of the laser beam that is subjected to the second divergence angle narrowing processing and that is emitted by the light emission device 110, and the divergence angle narrowing degree of the laser beam that is subjected to the second divergence angle narrowing processing and that is emitted by the light emission device 110 is greater than a divergence angle narrowing degree of the laser beam that is subjected to the third divergence angle narrowing processing and that is emitted by the light emission device 110.

For example, the divergence angle of the laser beam emitted by the light emission device 110 is 30°; and the angle narrowing assembly performs the first divergence angle narrowing processing to reduce the laser beam emitted by the light emission device 110 to about 0° (to reduce the divergence angle by 30°), that is, a laser beam subjected to the first divergence angle narrowing processing via the angle narrowing assembly is close to a collimated laser beam. The angle narrowing assembly performs the second divergence angle narrowing processing on the laser beams emitted by the light emission device 110 until two adjacent laser beams just cover an interval between angles of view of the collimated laser beams subjected to the first divergence angle narrowing processing, that is, light spots formed by the laser beams in the detection region that are subjected to the second divergence angle narrowing processing via the angle narrowing assembly are in a state of abutting on each other. The angle narrowing assembly performs the third divergence angle narrowing processing on the laser beams emitted by the light emission device 110 until two adjacent laser beams just exceeds an interval between angles of view of the collimated laser beams subjected to the first divergence angle narrowing processing, that is, light spots formed by the laser beams in the detection region that are subjected to the second divergence angle narrowing processing via the angle narrowing assembly are in a state of overlapping with each other.

After the laser beam emission module 100 performs the first divergence angle narrowing processing through the angle narrowing assembly, an emitted outgoing beam is usually referred to as a collimated laser beam; and after the laser beam emission module 100 performs the second divergence angle narrowing processing or the third divergence angle narrowing processing through the angle narrowing assembly, an emitted outgoing beam is usually referred to as a uniformized laser beam. As for how to implement the first divergence angle processing, the second divergence angle processing or the third divergence angle processing through the angle narrowing assembly, a type, a parameter and the like of a lens in the angle narrowing assembly can be selected based on an actual light spot requirement, so that the angle narrowing assembly has a corresponding effect of narrowing the divergence angle and a detection laser beam emitted by the emission module enters a corresponding state.

In some embodiments, at least one surface of at least one lens in the angle narrowing assembly is an aspheric lens, configured to correspondingly process multiple laser beams one to one that are emitted by the light emission device 110 correspondingly to different detection fields of view, so that the multiple outgoing beams satisfy detection requirements such as the detection angle of view and a light spot shape for multiple detection sub-fields of view. An aspheric lens has a better radius of curvature, which can maintain good aberration correction, thereby obtaining required performance and facilitating a miniaturization design.

Figure 4:
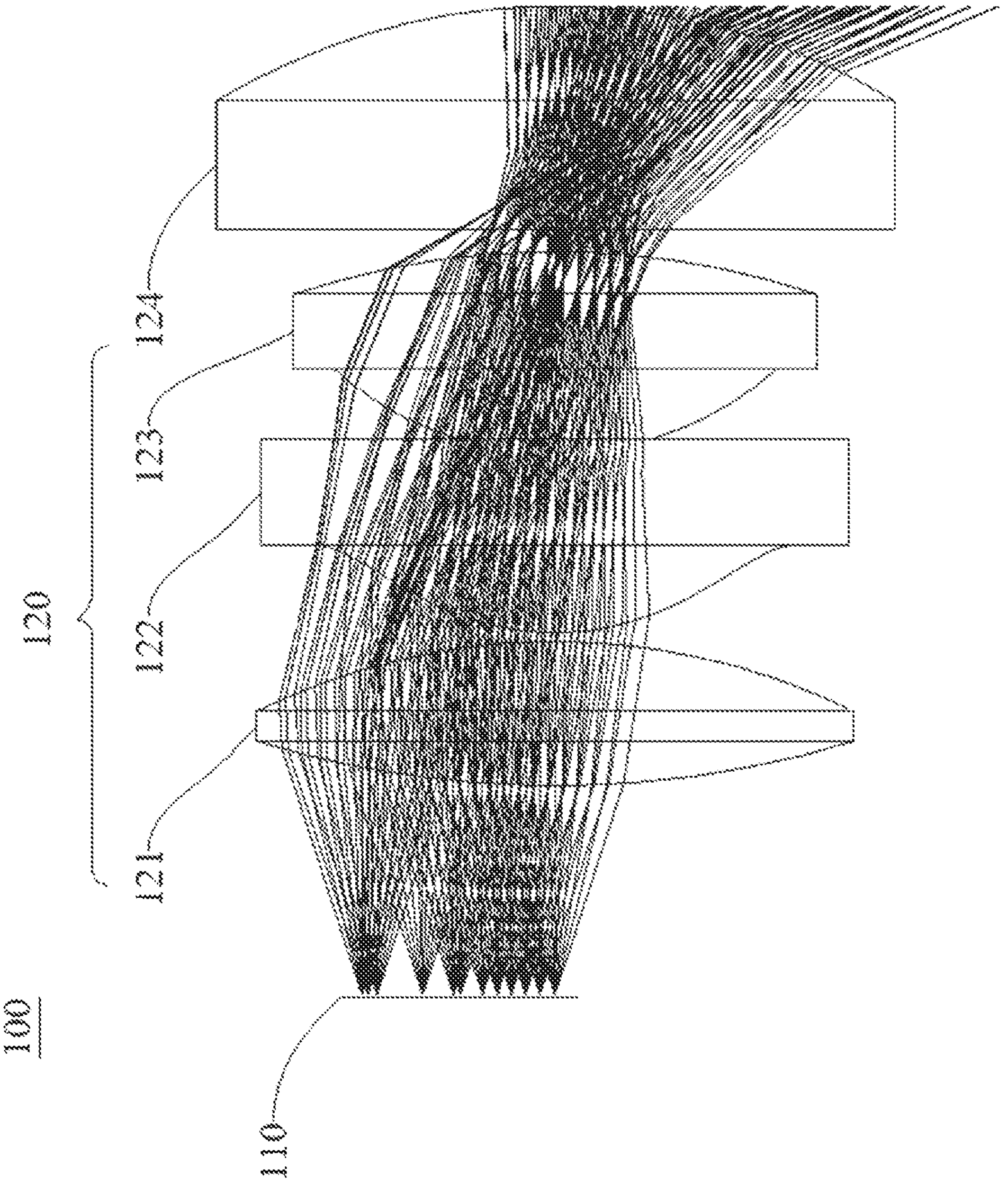
FIG. 4 is a schematic structural diagram of an optical path of a laser beam emission module used according to some embodiments of this application.

Referring to FIG. 4, in some embodiments, the emission lens 120 includes a first lens 121, a second lens 122, a third lens 123, and a fourth lens 124. The first lens 121, the second lens 122, and the third lens 123 are positive lenses and are configured to form an angle narrowing assembly; the fourth lens 124 is a negative lens and is configured to form a beam expanding assembly; and the second lens 122 is an aspheric lens, and the first lens 121, the third lens 123 and the fourth lens 124 are spherical lenses.

As shown in FIG. 4, each emission lens 120 includes 1 aspheric lens and 3 spherical lenses, the first three lenses are positive lenses, the last lens is a negative lens, the aspheric lens is the second positive lens, the emission lens 120 is an f-θ lens with a focal length of 3.658 mm, and a total length from the light emission surface of the light emission device 110 to the last lens is 21.86 mm.

As shown in FIG. 1, in some embodiments, the LiDAR includes one laser beam receiving module 200, and the focal length $f_2$ of the receiving lens 220 of the laser beam receiving module 200 is set to be less than the second focal length value, so that a total receiving angle of view $\theta_2$ of the laser beam receiving module 200 is greater than the second preset value. The receiving angle of view $\theta_2$ of the laser beam receiving module 200, a dimension $H_2$ of a detection surface of the detection device 210, and the focal length $f_2$ of the receiving lens 220 also satisfy the foregoing formula (1): $H_2=f_2*\theta_2$. In this case, the receiving angle of view $\theta_2$ of the laser beam receiving module 200 satisfies $\theta_2=H_2/f_2$, that is, the receiving angle of view $\theta_2$ of the laser beam receiving module 200 is inversely proportional to the focal length $f_2$ of the receiving lens 220. When the dimension $H_2$ of the detection device 210 remains unchanged, the laser beam receiving module 200 sets the focal length $f_2$ of the receiving lens 220 to be less than the second focal length value, to reduce the focal length $f_2$ of the receiving lens 220, which can expand the receiving angle of view $\theta_2$ of the laser beam receiving module 200, so that the receiving angle of view $\theta_2$ of the laser beam receiving module 200 is greater than the second preset value. In addition, the laser beam receiving module 200 provided in this application uses a receiving lens 220 with a smaller focal length to enlarge the receiving angle of view, instead of increasing the dimension of the detection device 210 to enlarge the receiving angle of view, thereby avoiding problems such as difficulty in driving hardware of the detection device 210, and an increase in manufacturing costs that are caused by an increase in the dimension of the detection device 210.

In some embodiments, the second preset value is 90°×30°, namely, (π/2)*(π/6) in radians, and when the dimension of the detection device 210 remains unchanged, the laser beam receiving module 200 reduces a focal length of the receiving lens 220, so that the receiving angle of view can be equal to 120°×40°, namely, (2π/3)*(2π/9) in radians. Herein, 90° and 120° are horizontal receiving angles of view, and 30° and 40° are vertical receiving angles of view.

Figure 5:
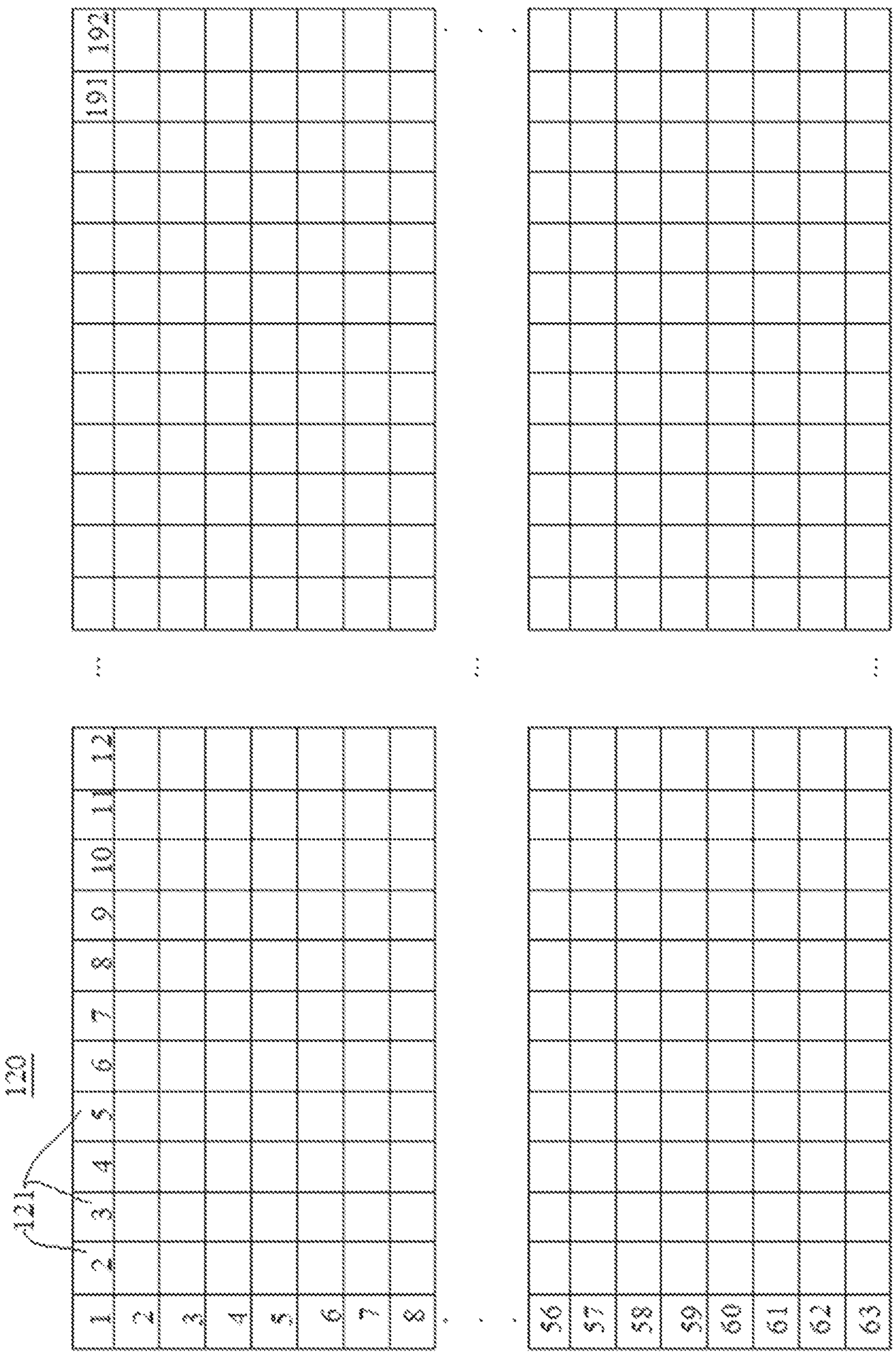
FIG. 5 is a schematic diagram of an arrangement of a detection unit in a detection device used according to some embodiments of this application.

Further, as shown in FIG. 5, the detection device 210 of the laser beam receiving module 200 includes multiple detection units 211 that are arranged along the horizontal direction and the vertical direction and that are configured to receive multiple echo laser beams processed by the receiving lens 220. Correspondingly, a receiving angle of view corresponding to the laser beam receiving module 200 covers specific angle ranges along the horizontal direction and the vertical direction. The angles of view covered by the receiving angle of view corresponding to the laser beam receiving module 200 along the horizontal direction and the vertical direction are respectively a horizontal receiving angle of view $\theta_{2x}$ and a vertical receiving angle of view $\theta_{2y}$. In this case, a dimension $H_{2x}$ of a total light emission surface of the detection device 210 of the laser beam receiving module 200 along the horizontal direction, the focal length $f_2$ of the receiving lens 220 and the horizontal receiving angle of view $\theta_{2x}$ (in radians) of the laser beam receiving module 200 also satisfy the formula (1): $\theta_{2x}=H_{2x}/f_2$; and a dimension $H_{2y}$ of a total light emission surface of the detection device 210 of the laser beam receiving module 200 along the vertical direction, the focal length f2 of the receiving lens 220 and the vertical receiving angle of view $\theta_{2y}$ (in radians) of the laser beam receiving module 200 also satisfy the formula (1): $\theta_{2y}=H_{2y}/f_2$.

For the laser beam receiving module 200, the horizontal receiving angle of view $\theta_{2x}$ and the vertical receiving angle of view $\theta_{2y}$ of the laser beam receiving module 200 are negatively correlated with the focal length $f_2$ of the receiving lens 220. When the dimension $H_2$ of the detection surface of the detection device 210 corresponding to the laser beam receiving module 200 remains unchanged, that is, the dimension $H_{2x}$ of the detection surface of the detection device 210 corresponding to the laser beam receiving module 200 along the horizontal direction and the dimension $H_{2y}$ of the detection surface thereof along the vertical direction remain unchanged, the focal length $f_2$ of the receiving lens 220 in the laser beam receiving module 200 is set to be less than the second focal length value, to reduce the focal length $f_2$ of the receiving lens 220 and enlarge the horizontal receiving angle of view $\theta_{2x}$ and the vertical receiving angle of view $\theta_{2y}$ of the laser beam receiving module 200, so that the horizontal receiving angle of view $\theta_{2x}$ of the laser beam receiving module 200 is greater than the second horizontal preset value, and the vertical receiving angle of view $\theta_{2y}$ of the laser beam receiving module 200 is greater than the second vertical preset value.

In the LiDAR provided in this application, focal length $f_2$ of the receiving lens 220 in the laser beam receiving module 200 is reduced, to enlarge a horizontal receiving angle of view $\theta_{2x}$ and a vertical receiving angle of view $\theta_{2y}$ of the laser beam receiving module 200, so that the horizontal receiving angle of view $\theta_{2x}$ of the laser beam receiving module 200 is greater than the second horizontal preset value, and the vertical receiving angle of view $\theta_{2y}$ is greater than the second vertical preset value. In addition, the LiDAR provided in this application uses a receiving lens 220 with a smaller focal length to enlarge the horizontal receiving angle of view $\theta_{2x}$ and the vertical receiving angle of view $\theta_{2y}$, instead of increasing the dimension of the detection device 210 along a corresponding direction to enlarge the horizontal receiving angle of view $\theta_{2x}$ and the vertical receiving angle of view $\theta_{2y}$, thereby avoiding problems such as difficulty in driving hardware of the detection device 210, and an increase in manufacturing costs that are caused by an increase in the dimension of the detection device 210.

In an example, the second preset value is 90°*30°, the second horizontal preset value is 90°, and the second vertical preset value is 30°. In some embodiments, when the second preset value is 90°×30°, and the laser beam receiving module 200 of the LiDAR is designed, simulation software can be first used to design a laser beam receiving module 200 with the receiving angle of view of 90°×30°, and then an optical parameter of at least one lens in the receiving lens 220 is adjusted, to reduce the focal length of the receiving lens 220, thereby enlarging the receiving angle of view of the laser beam receiving module 200.

In some embodiments, the total receiving angle of view of all laser beam receiving modules 200 in the LiDAR is 120°×40°, that is, the horizontal receiving angle of view $\theta_{2x}$ is 120° (2π/3 radians), and the vertical receiving angle of view $\theta_{2y}$ is 40° (2π/9 radians), that is, the dimension H2x of the detection surface of the detection device 210 in the laser beam receiving module 200 along the horizontal direction and the dimension $H_{2y}$ of the detection surface thereof along the vertical direction satisfy: $H_{2x}/H_{2y}=(2\pi/3)/(2\pi/9)=3$. In addition, the dimension $H_{2x}$ of the detection surface of the detection device 210 in the laser beam receiving module 200 along the horizontal direction and the dimension $H_{2y}$ of the detection surface thereof along the vertical direction, and the focal length $f_2$ of the receiving lens 220 in the laser beam receiving module 200 satisfy: $2\pi/3=H_{2x}/f_2$, and $2\pi/9=H_{2y}/f_2$.

In some embodiments, the receiving lens 220 of the laser beam receiving module 200 has a second optical axis 220'; and the detection devices 210 are on two sides of the second optical axis 220' along the horizontal direction, that is, a position range covered by the detection surface of the detection device 210 along the horizontal direction is $[-(H_{2x}/2)]$ to $[+(H_{2x}/2)]$, and correspondingly, a receiving angle of view of the laser beam receiving module 200 along the horizontal direction is $-(\theta_{2x}/2)$ to $+(\theta_{2x}/2)$. The detection devices 210 are on the two sides of the second optical axis 220' along the vertical direction, that is, a position range covered by the detection surface of the detection device 210 along the vertical direction is $[-(H_{2y}/2)]$ to $[+(H_{2y}/2)]$, and correspondingly, a receiving angle of view of the laser beam receiving module 200 along the vertical direction is $-(\theta_{2y}/2)$ to $+(\theta_{2y}/2)$. The receiving angle of view of the laser beam receiving module 200 matches a combined emission angle of view of the two laser beam emission modules 100, $\theta_{1x}=\theta_{2x}$ and $\theta_{1y}=\theta_{2y}$.

In some embodiments, the detection device 210 uses a SPAD (Single-Photon Avalanche Diode) array, including a total of 192×63 pixels (pixels, that is, detection units 211), where 192/63≈3. 144×48 laser beams emitted by the two laser beam emission modules 100 are correspondingly received by 192×63 single-point detection units 211. The maximum single-sided dimension of the detection units 211 on a diagonal line is 3.17 mm, and therefore, laser beams within ±60° in a horizontal direction and ±20° in a vertical direction can be received.

Compared with the receiving lens 220 in the laser beam receiving module with a receiving angle of view of 90°×30°, the receiving lens 220 with a receiving angle of view of 120°×40° has a shorter focal length, thereby implementing a larger receiving angle under the same image height.

In some embodiments, the receiving lens 220 includes a beam narrowing assembly and a focusing assembly arranged sequentially along a receiving optical path of the laser beam receiving module 200, and the beam narrowing assembly has negative optical power, includes at least one lens, and is configured to narrow an angle of view for receiving an echo laser beam; and the focusing assembly has positive optical power, includes at least one lens, and is configured to focus an echo laser beam on the detection device 210 that has been subjected to narrowing processing of the angle of view. In some embodiments, the receiving lens of the laser beam receiving module 200 also satisfies: $f_2=(f_{21}*f_{22})/(f_{21}+f_{22}-d_2)$, where $f_{21}$ is a focal length of the at least one lens included in the focusing assembly, $f_{22}$ is a focal length of the at least one lens included in the beam narrowing assembly, and $d_2$ is a distance between optical centers of the focusing assembly and the beam narrowing assembly.

In some embodiments, at least one surface of at least one lens in the focusing assembly is aspheric and is used for focusing laser beams on multiple detection units 211 for corresponding one-to-one processing, so that echo signals are focused on the corresponding detection unit 211. An aspheric lens has a better radius of curvature, which can maintain good aberration correction, thereby obtaining required performance and facilitating a miniaturization design.

Figure 6:
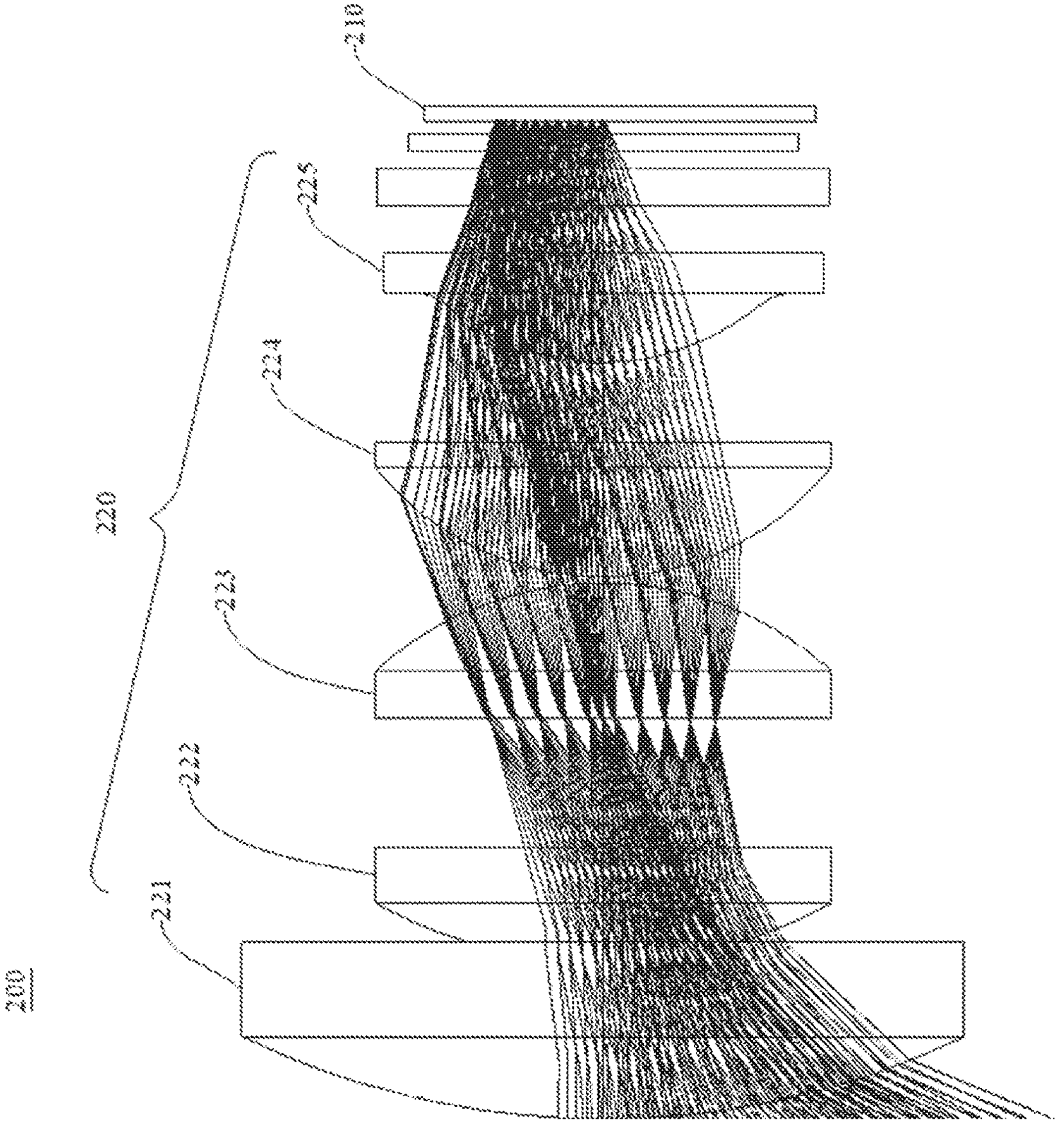
FIG. 6 is a schematic structural diagram of an optical path of a laser beam receiving module used according to some embodiments of this application.

Referring to FIG. 6, in some embodiments, the receiving lens 220 includes a fifth lens 221, a sixth lens 222, a seventh lens 223, an eighth lens 224, and a ninth lens 225. Herein, the fifth lens 221 and the sixth lens 222 are negative lenses for forming a beam narrowing assembly. The seventh lens 223, the eighth lens 224, and the ninth lens 225 are positive lenses for forming a focusing assembly. The ninth lens 225 is an aspheric lens, and the other lenses are spheric lenses.

As shown in FIG. 6, the receiving lens 220 includes 1 aspheric lens and 4 spheric lenses, the first two lenses are negative lenses, the last three lenses are positive lenses, the aspheric lens is the last positive lens, the receiving lens 220 is also an f-θ lens with a focal length of 2.68 mm, and a total length from the first lens to a receiving chip is 29.86 mm.

To allow more echo laser beams to enter the receiving lens 220 smoothly, in some embodiments, the receiving lens 220 satisfies the following conditional formula: D>3 mm, where D is a receiving aperture of the receiving lens 220. In some embodiments, the receiving aperture of the receiving lens 220 is increased, so that the echo laser beam within a larger angle range can enter the receiving lens 220 smoothly, that is, the receiving angle of view of the receiving lens 220 is increased, thereby improving receiving power and a detection distance of the LiDAR.

This application imposes no limitation on the quantity of lenses included in the beam narrowing assembly, provided that the angle of view of the echo laser beam can be reduced and an echo laser beam with a large angle of view can be received. Similarly, this application imposes no limitation on the quantity of lenses included in the focusing assembly, provided that the echo laser beam can be focused on the corresponding detection unit 211. There are various combination forms of the receiving lens 220, which can meet more use needs. In some embodiments, the LiDAR can further include multiple laser beam emission modules 100, in addition to two laser beam emission modules, for example, can include two or more than two laser beam emission modules 100. The more than two laser beam emission modules 100 can be disposed around the laser beam receiving module 200. In this case, a combination of emission angles of view of the multiple laser beam emission modules 100 matches a receiving angle of view of the laser beam receiving module 200. Emission angles of view of the multiple emission modules 100 may be equal or unequal.

It can be understood that "multiple" refers to "two or more than two"; when there are two laser beam emission modules 100 and one laser beam receiving module 200, the two laser beam emission modules 100 are respectively arranged on two sides of the laser beam receiving module 200; and when there are three or more than three laser beam emission modules 100 and one laser beam receiving module 200, the multiple laser beam emission modules 100 are arranged around the laser beam receiving module 200. When there are multiple laser beam receiving modules 200, the multiple laser beam receiving modules 200 can form an assembly and be arranged as a whole. In this case, for a distribution manner of the laser beam receiving modules 200 and the laser beam emission modules 100, refer to a distribution manner when there is one laser beam receiving module 200. The laser beam receiving modules and the laser beam emission modules can also be distributed dispersedly, and in this case, one laser beam receiving module 200 and one or more laser beam emission modules 100 can be arranged correspondingly one to one, to form a laser beam transceiver module.

A second aspect of this application provides a LiDAR design method, including a step for designing a laser beam emission module and a step for designing a laser beam receiving module, where the step for designing a laser beam emission module includes:

S11. Select a light emission device based on a required total emission angle of view.

S12. Set a focal length of at least one emission lens to be less than a first focal length value based on the required total emission angle of view and the selected light emission device, so that a total emission angle of view of at least one laser beam emission module is greater than a first preset value.

In an example, step S11 includes: selecting the light emission device based on the required horizontal emission angle of view $\theta_{1x}$ and vertical emission angle of view $\theta_{1y}$, where a difference between $\theta_{1x}/\theta_{1y}$ and a ratio of the dimension of the light emission surface of the light emission device along the horizontal direction to the dimension of the light emission surface along the vertical direction is within a first tolerance range.

In an example, the ratio of the dimension of the light emission surface of the light emission device along the horizontal direction to the dimension of the light emission surface along the vertical direction is equal to $\theta_{1x}/\theta_{1y}$. The first tolerance range can be set based on an actual accuracy requirement, for example, ±0.03, ±0.04, or ±0.05. This is not limited in this application.

Further, when there is one laser beam emission module, the dimension of the light emission surface of the light emission device corresponding to the laser beam emission module along the horizontal direction is $H_{1x}$, and correspondingly, the emission field of view of the laser beam emission module along the horizontal direction is $\theta_{1x}$; and the dimension of the light emission surface of the light emission device corresponding to the laser beam emission module along the vertical direction is $H_{1y}$, and correspondingly, the emission field of view of the laser beam emission module along the vertical direction is $\theta_{1y}$, where $H_{1x}/H_{1y}=\theta_{1x}/\theta_{1y}$. When there are two laser beam emission modules and the two laser beam emission modules are arranged on two sides of the laser beam receiving module along the horizontal direction, the dimension of the light emission surface of the light emission device corresponding to each laser beam emission module along the horizontal direction is $H_{1x}/2$, and correspondingly, the emission field of view of each laser beam emission module along the horizontal direction is $\theta_{1x}/2$; and the dimension of the light emission surface of the light emission device corresponding to each laser beam emission module along the vertical direction is $H_{1y}/2$, and correspondingly, the emission field of view of each laser beam emission module along the vertical direction is $\theta_{1y}/2$.

In an example, step S12 includes:

based on the required horizontal emission angle of view $\theta_{1x}$ and vertical emission angle of view $\theta_{1y}$, and the obtained dimension of the light emission surface of the light emission device, calculating a focal length of the emission lens; and designing the emission lens based on the calculated focal length of the emission lens, and designing the number of lenses, a type of lens and arrangement of each lens required for the emission lens based on a divergence angle narrowing function and an angle of view enlarging function required for the emission lens.

The arrangement of the lenses includes an arrangement sequence of the lenses, a distance between the lenses, and the like.

It should be noted that when the focal length (that is, the effective focal length f1) of the emission lens is fixed, the number of lenses, the type of lenses and the arrangement manner of lenses required for the foregoing emission lens to implement the required emission angle of view are not necessarily exclusive, but can be implemented in various forms.

Based on the required horizontal emission angle of view $\theta_{1x}$ and vertical emission angle of view $\theta_{1y}$, the light emission device is first obtained, and then based on the horizontal emission angle of view $\theta_{1x}$ and the vertical emission angle of view $\theta_{1y}$, and the obtained dimension of the light emission device, the focal length $f_1$ of the emission lens is calculated via the formula (1), and then the emission lens 120 with the required emission angle of view is designed through the focal length $f_1$. The required emission angle of view is greater than the first preset value corresponding to the emission angle of view of the LiDAR. In this way, LiDAR suitable for detecting a large field of view can be designed in the LiDAR design method provided in embodiments of this application.

To expand the total emission angle of view of all the laser beam emission modules and improve a light emission effect of the laser beam emission module 100, in some embodiments, a step for designing the laser beam emission module also includes:

S13. Obtain multiple pieces of light spot data formed by the outgoing beams emitted after multiple laser beams emitted by the light emission device are processed by the emission lens, and determine whether the light emission effect of the laser beam emission module satisfies an expectation based on the obtained multiple pieces of light spot data, where if the light emission effect of the laser beam emission module satisfies the expectation, the emission lens satisfies the requirement; or if the light emission effect of the laser beam emission module does not satisfy the expectation, the design of the emission lens needs to be further optimized while keeping the focal length unchanged.

The light spot data includes the emission angle corresponding to each light spot, shape data of each light spot, and/or a distance between two adjacent light spots obtained after each laser beam emitted by the light emission device is processed by the emission lens, and the shape data of the light spot includes a size and/or a shape of the light spot. It can be determined whether the light emission effect of the laser beam emission module satisfies the expectation based on whether the emission angle corresponding to each light spot reaches the preset angle of view (that is, whether each laser beam is emitted to the corresponding angle of view), whether the size of the light spot is within the preset size range, and whether the shape of the light spot satisfies the expectation, or based on other multiple parameters.

The size of the light spot includes one or more types of light spot data such as a length along the long axis, a length along the short axis, and azimuth along the long axis of the light spot. The shape of the light spot can be derived from the size of the light spot, or can be obtained from an image of the light spot, and can be flexibly selected based on the use need. When the shape of the light spot needs to be detected, if the shape of the light spot can be derived from the size of the light spot, the foregoing shape data of the light spot may only include the size of the light spot; or if the shape of the light spot is obtained via an image analysis, the foregoing shape data of the light spot may include the shape of the light spot.

The emission lens may be optimized in manners such as a simulation analysis and an experiment, including various implementation manners.

In some embodiments, the optimization of the emission lens includes: determining whether the angle of view corresponding to each light spot, the shape data of each light spot, and/or the distance between two adjacent light spots matches the preset data; and if no, adjusting the current parameter of the emission lens until the light spot data matches the preset data.

In the foregoing optimization method, the matching can mean that the light spot data and the preset data are exactly the same, or mean that the difference between the light spot data and the preset data is within a preset error range, and can be flexibly selected based on the use need. In this case, the current parameter of each lens in the emission lens can be optimized via experiment or simulation calculation. For example, one or more lenses are replaced with a lens with a different parameter until the light spot data matches the preset data; or different parameters of the lens are changed one by one via the simulation software, the corresponding light spot data is calculated, and the parameter which can ensure that the light spot data matches the preset data is selected.

To further expand the emission angle of view, based on the foregoing embodiments, the parameter of the lens used for beam expansion in the emission lens can be further adjusted, so that the emission angle of view of the emission lens is greater than the preset emission angle of view.

Further, a step for designing a laser beam receiving module includes:

S21. Select a detection device based on the required total receiving angle of view.

S22. Set a focal length of at least one receiving lens to be less than a second focal length value based on the required total receiving angle of view and the selected light detection device, so that a total receiving angle of view of at least one laser beam receiving module is greater than a second preset value.

In an example, step S21 includes: selecting the detection device based on the required horizontal receiving angle of view $\theta_{2x}$ and vertical receiving angle of view $\theta_{2y}$, where a difference between $\theta_{2x}/\theta_{2y}$ and a ratio of the dimension of the detection surface of the detection device along the horizontal direction to the dimension of the detection surface along the vertical direction is within a second tolerance range. The total receiving field of view of the laser beam receiving module at least partially overlaps with the total emission field of view of the laser beam emission module.

In an example, the ratio of the dimension of the detection surface of the detection device along the horizontal direction to the dimension of the light emission surface along the vertical direction is equal to $\theta_{2x}/\theta_{2y}$. The second tolerance range can be set based on an actual accuracy requirement, for example, ±0.03, ±0.04, or ±0.05.

In an example, the total receiving field of view of the laser beam receiving module matches the total emission field of view of the laser beam emission module.

In an example, when there are one laser beam emission module and one laser beam receiving module, the emission field of view of the laser beam emission module matches the receiving field of view of the receiving module, that is, $\theta_{2x}=\theta_{1x}$, and $\theta_{2y}=\theta_{1y}$. When there are two laser beam emission modules and one laser beam receiving module, the two laser beam emission modules are on two sides of the laser beam receiving module along the horizontal direction, and a combined emission field of view of the two laser beam emission modules matches the receiving field of view of the laser beam receiving module, that is, $\theta_{2x}=(\theta_{1x}/2)+(\theta_{1x}/2)=\theta 1x$, and $\theta_{2y}=\theta_{1y}$.

In an example, step S22 includes: based on the required horizontal receiving angle of view $\theta_{2x}$ and vertical receiving angle of view $\theta_{2y}$, and the obtained dimension of the detection surface of the detection device, calculating a focal length of the receiving lens.

In an example, designing the receiving lens based on the calculated focal length of the receiving lens, and designing the number of lenses, a type of lens and arrangement of each lens required for the receiving lens based on an angle of view narrowing function and a focusing function required for the receiving lens. The arrangement of the lenses includes an arrangement sequence of the lenses, a distance between the lenses, and the like.

It should be noted that when the focal length (that is, the effective focal length $f_2$) of the receiving lens is fixed, the number of lenses, the type of lenses and the arrangement manner of lenses required for the foregoing receiving lens to implement the required receiving angle of view are not necessarily exclusive, but can be implemented in various forms. The number of lenses, the type of lenses and the arrangement manner of lenses required for the receiving lens to implement the required emission angle of view are determined based on the required emission angle of view and a detection requirement.

Based on the required horizontal receiving angle of view $\theta_{2x}$ and vertical receiving angle of view $\theta_{2y}$, the detection device is first obtained, and then based on the horizontal receiving angle of view $\theta_{2x}$ and the vertical receiving angle of view $\theta_{2y}$, and the obtained dimension of the detection device 210, the focal length $f_2$ of the receiving lens is calculated via the formula (1), and then the receiving lens with the required receiving angle of view is designed through the focal length $f_2$. The required receiving angle of view is greater than the second preset value corresponding to the receiving angle of view of the LiDAR. In this way, a LiDAR suitable for detecting a large field of view can be designed using the LiDAR design method provided in embodiments of this application. The method is simple and easy to perform. To expand the receiving angle of view of the laser beam receiving module and improve a light focusing effect of the laser beam receiving module, in some embodiments, a step for designing the laser beam receiving module also includes:

S23. Obtain multiple pieces of echo light spot data formed after multiple echo laser beams are processed by the receiving lens, and determine whether the light focusing effect of the laser beam receiving module satisfies an expectation based on the obtained multiple pieces of echo light spot data, where if the light focusing effect of the laser beam receiving module satisfies the expectation, the receiving lens satisfies the requirement; or if the light focusing effect of the laser beam receiving module does not satisfy the expectation, the design of the receiving lens 220 needs to be further optimized while keeping the effective focal length f2 unchanged.

The echo light spot data includes a position of each echo light spot on the detection device that is formed after each echo laser beam reflected from different angles of view is focused by the receiving lens, and a size of each echo laser beam. It can be determined whether the light focusing effect of the laser beam receiving module satisfies the expectation based on whether multiple echo light spots are focused on detection units correspondingly one to one (that is, whether the echo laser beams reflected from the corresponding angle of view are focused on the detection units correspondingly one to one), and whether the size of the echo light spot is within the preset size range, or based on other multiple parameters.

Further, in some embodiments, the size of the echo light spot processed by the receiving lens 220 is less than a specific preset value, for example, a size of two detection units (that is, a size of two pixels), or a size of three detection units (that is, a size of three pixels). The size of the light spot is not limited in this application. One pixel is a detection area corresponding to one detection unit 211.

In an example, the receiving lens may be optimized in manners such as a simulation analysis and an experiment, including various implementation manners.

In some embodiments, the optimization of the receiving lens includes: determining whether the echo laser beam corresponding to each echo light spot is focused on a detection unit at a corresponding position and/or whether the size of each echo light spot matches the preset data; and if no, adjusting the current parameter of the receiving lens until the echo light spot data matches the preset data.

In the foregoing optimization method, the matching can mean that the echo light spot data and the preset data of the laser beam receiving module are exactly the same, or mean that the difference between the echo light spot data and the preset data of the laser beam receiving module is within a preset error range, and can be flexibly selected based on the use need. In this case, the current parameter of each lens in the receiving lens can be optimized via experiment or simulation calculation. For example, one or more lenses are replaced with a lens with a different parameter until the echo light spot data matches the preset data of the laser beam receiving module 200; or different parameters of the lens are changed one by one via the simulation software, the corresponding echo light spot data is calculated, and the parameter which can ensure that the light spot data matches the preset data is selected.

To further expand the receiving angle of view, based on the foregoing embodiments, the parameter of the lens used for beam narrowing in the receiving lens can be further adjusted, so that the receiving angle of view of the receiving lens is greater than the preset receiving angle of view.

Different from previous embodiments, in some embodiments, the emission lens 120 is an f-tan θ lens, and the laser beam emission module 100 satisfies: $f_1=(H_{1x}/\tan(\theta_{1x}))=(H_{1y}/\tan(\theta_{1y}))$, $\theta_{1x}=\arctan(H_{1x}/f_1)$, and $\theta_{1y}=\arctan(H_{1y}/f_1)$. The receiving lens 220 is an f-tan θ lens, and the laser beam receiving module 200 satisfies: $f1=(H_{1x}/\tan(\theta_{1x}))=(H_{1y}/\tan(\theta_{1y}))$, $\theta_{1x}=\arctan(H_{1x}/f_1)$, and $\theta_{1y}=\arctan(H_{1y}/f_1)$.

In some embodiments, when the dimension $H_{1x}$ of the total light emission surface of the light emission devices 110 corresponding to all the laser beam emission modules 100 along the horizontal direction and the dimension $H_{1y}$ of the total light emission surface thereof along the vertical direction remain unchanged, the laser beam emission module 100 reduces the focal length $f_1$ of the emission lens 120, so that the horizontal emission angle of view $\theta_{1x}$ of the laser beam emission module 100 is greater than the first horizontal preset value, and the vertical emission angle of view $\theta_{1y}$ is greater than the first vertical preset value. When the dimension $H_{2x}$ of the total light emission surface of the detection devices 210 corresponding to all the laser beam receiving modules 200 along the horizontal direction and the dimension $H_{2y}$ of the total light emission surface thereof along the vertical direction remain unchanged, the laser beam receiving module 200 reduces the focal length $f_2$ of the receiving lens 220, so that the horizontal emission angle of view $\theta_{1x}$ of the laser beam receiving module 200 is greater than the second horizontal preset value, and the vertical emission angle of view $\theta_{2y}$ is greater than the second vertical preset value.

In some embodiments, each laser beam emission module 100 includes N light emission devices 110, N is a positive integer greater than or equal to 2, and the N light emission devices 110 in each laser beam emission module 100 are arranged sequentially along the vertical direction. Light emission surfaces of the N light emission devices 110 corresponding to each laser beam emission module 100 cover different position ranges along the vertical direction, and a combined dimension of a spliced light emission surface of the N light emission devices 110 corresponding to each laser beam emission module 100 along the vertical direction is $H_{1y}$. For example, dimensions of light emission surfaces of N light emission devices 110 corresponding to one laser beam emission module 100 along the vertical direction are all equal to $H_{1y}/N$, where a position range covered by a first light emission device 110 along the vertical direction is $[+(H_{1y}/2)]$ to $[(H_{1y}/2)-(H_{1y}/N)]$, a position range covered by an nth light emission device 110 along the vertical direction is $[(H_{1y}/2)-(n-1)*(H_{1y}/N)]$ to $[(H_{1y}/2)-n*(H_{1y}/N)]$, and a position range covered by an $N^{th}$ light emission device 110 along the vertical direction is $[-(H_{1y}/2)+(H_{1y}/N)]$ to $[-(H_{1y}/2)]$, where n is a positive integer, and $1 \le n \le N$. The dimension of the combined light emission surface of the N light emission devices 110 in each laser beam emission module along the vertical direction is $H_{1y}$, the combined emission angle of view of N light emission devices 110 in each laser beam emission module along the vertical direction is equal to $\theta_{1y}=H_{1y}/f_1$, and $\theta_{1y}$ is negatively related to the focal length $f_1$ of the emission lens 120.

Further, on the premise that the focal lengths $f_1$ of the emission lenses 120 in the multiple laser beam emission modules 100 are reduced, and the total horizontal emission angle of view $\theta_{1x}$ and the total vertical emission angle of view $\theta_{1y}$ of all the laser beam emission modules 100 are enlarged, combining horizontal emission angles of view of the multiple laser beam emission modules 100 can reduce a dimension of the light emission surface required for the light emission device 110 used in a single laser beam emission module 100 along the horizontal direction, and further reduce a dimension of the light emission device 110 used in the single laser beam emission module 100, thereby obtaining a greater horizontal emission angle of view by further properly increasing the dimension of the light emission device 110 along the horizontal direction. Further, for each laser beam emission module 100, the combination of vertical emission angles of view through multiple light emission devices 110 not only increases the dimension of the light emission surface of each laser beam emission module 100 along the vertical direction, but also increases the emission angle of view of each laser beam emission module 100 along the vertical direction. For example, the dimensions of the light emission surfaces of the light emission devices 110 along the vertical direction are all $H_{1y}$, and in this case, the dimension of the combined light emission surface of N light emission devices 110 in each laser beam emission module 100 along the vertical direction is $N*H_{1y}$, and the emission angle of view of each laser beam emission module 100 along the vertical direction can be changed to $N*\theta_{1y}$. That is, in the LiDAR, the number of light emission devices 110 is increased in the laser beam emission module 100 along the vertical direction, which increases the dimension of the combined light emission surface of the laser beam emission module 100 along the vertical direction, and further increases the emission angle of view of the laser beam emission module 100 along the vertical direction.

In addition, splicing emission fields of view of multiple light emission devices 110 used in each laser beam emission module 100 along the vertical direction can increase the emission angle of view of the laser beam emission module 100 along the vertical direction without increasing the size of the light emission device 110, thereby avoiding problems such as an increase in emission power of the light emission device 110, non-uniformity of light emission, difficulty in driving hardware of the light emission device 110, and an increase in manufacturing costs that are caused by an increase in the dimension of the light emission device 110. Further, splicing emission fields of view of multiple light emission devices 110 along the vertical direction further properly increases the dimension of the light emission devices 110 along the vertical direction, to obtain a larger vertical emission angle of view.

Figure 7:
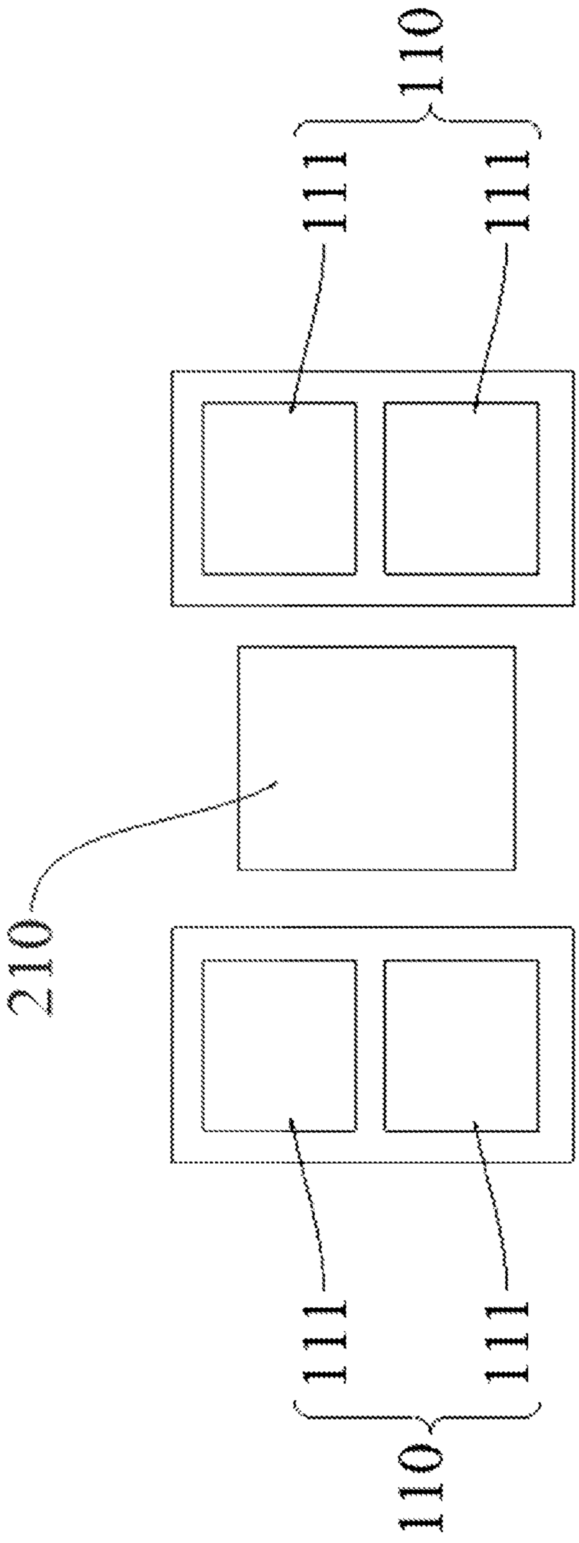
FIG. 7 is a schematic structural diagram of a LiDAR (equipped with no emission lens or receiving lens) according to some embodiments of this application.

As shown in FIG. 7, in some embodiments, each laser beam emission module 100 includes two light emission devices 110, and the two light emission devices 110 of each laser beam emission module 100 are on the same side of the first optical axis 102' along the horizontal direction, and the same side can be a side closer to the laser beam receiving module 200, or a side farther away from the receiving module 200. Corresponding four light emission devices 110 of the two laser beam emission modules 100 each are on one side of their respective corresponding first optical axes 102' that is closer to the laser beam receiving module 200 along the horizontal direction, or one side of their respective corresponding first optical axes 102' that is farther away from the laser beam receiving module 200. The two light emission devices 110 of each laser beam emission module 100 are arranged in sequence along the vertical direction, and in some embodiments, the two light emission devices 110 of each laser beam emission module 100 are arranged symmetrically on two sides of the first optical axis 102' along the vertical direction.

Figure 8:
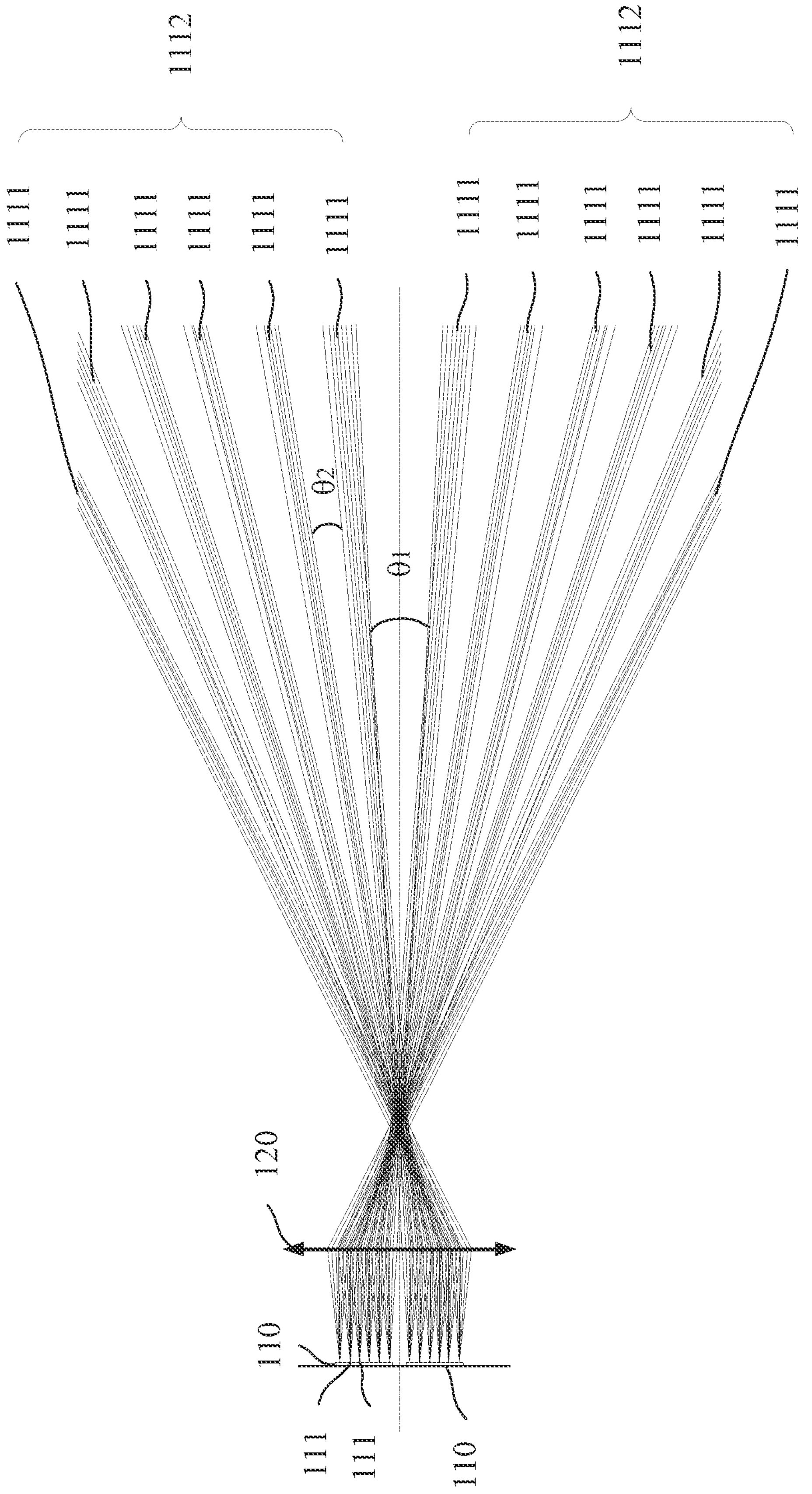
FIG. 8 is a schematic structural diagram of an optical path of a laser beam emission module (including no light beam adjustment module) according to some embodiments of this application.

As shown in FIG. 8, in some embodiments, when being installed, N light emission devices 110 in the same laser beam emission module 100 are arranged on the same emission board; and the emission board is provided with a drive circuit corresponding to N light emission devices 110, and the drive circuit is configured to provide a drive signal for the N light emission devices 110, to drive the N light emission devices 110 to emit light. In this case, with the drive circuit provided, N light emission devices 110 are arranged at intervals, and a distance between two adjacent light emission devices 110 is much larger than a distance between two adjacent light emission units 111 in the single light emission device 110, and as a result, after the laser beam groups emitted by the two adjacent light emission devices 110 in the laser beam emission module 100 are processed by the emission lens 120, a larger interval between angles of view appears in the middle region, that is, a larger blind spot, which affects a detection effect of the LiDAR in the entire detection field of view.

Figure 9:
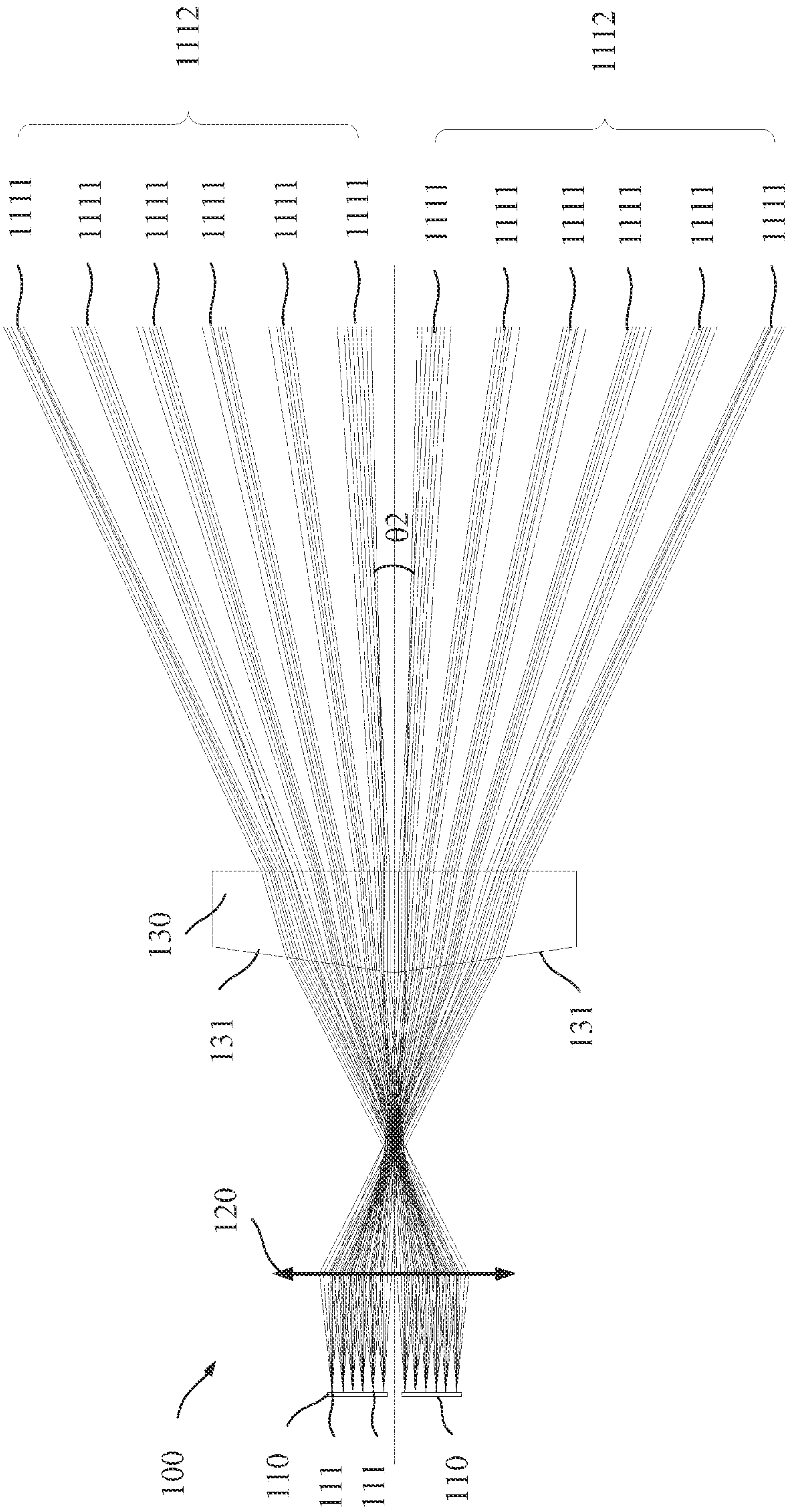
FIG. 9 is a schematic structural diagram of an optical path of a laser beam emission module (including a light beam adjustment module) according to some embodiments of this application.

As shown in FIG. 9, for example, N=2, the laser beam emission module 100 provided in some embodiments of this application further includes a light beam adjustment module, the light beam adjustment module is located on a light outgoing side of the emission lens 120 and configured to adjust an interval between angles of view of all or some of outgoing beams output by the emission lens 120, so that an interval between angles of view of every two adjacent outgoing beams is less than or equal to a preset value. Herein, the preset value can be close to or equal to the interval between angles of view of every two adjacent outgoing beams in an outgoing beam group corresponding to an individual light emission device 110, to resolve a problem of affecting the detection effect in the entire detection field of view when a larger blind spot appears because the interval between the angles of view of the two outgoing beam groups 1112 of two adjacent light emission devices 110 is excessively large.

Further, the light beam adjustment module performs angle deflection and/or light spot expansion on all or some of outgoing laser beams 1111 along the vertical direction that are output by the emission lens 120, so that the interval between the angles of view of every two adjacent outgoing beams 1111 in all the outgoing beams 1111 along the vertical direction that are output by the laser beam emission module 100 is less than or equal to the preset value. The preset value can be a range preset when a system is designed. For example, in an outgoing beam group corresponding to one light emission device, the interval between the angles of view of two adjacent outgoing beams is 0.34°. The preset value can be 0.32°, 0.33°, 0.34°, 0.35°, and other values. This is not limited in this application. Further, the preset value can be any value between 0° and 0.4°. It can be understood that the preset value is less than the interval θ1 between the angles of view of the two outgoing beam groups 1112 corresponding to two adjacent light emission devices 110 that are not processed by the light beam adjustment module. In some embodiments, the interval between the angles of view of the two outgoing beams in two outgoing beam groups corresponding to the two adjacent light emission devices 110 adjusted by the light beam adjustment module is close to or equal to the interval θ2 between angles of view of two adjacent outgoing beams 1111 in an outgoing beam group 1112 corresponding to an individual light emission device 110.

In some embodiments, the light beam adjustment module includes a refractive optical structure 130, the refractive optical structure 130 is on a light outgoing side of the emission lens 120 and configured to receive all or some of the outgoing beam groups 1112 output by the emission lens 120 and refract a light beam, so that the received outgoing beam group 1112 is deflected along the vertical direction of approaching a middle field of view after being refracted by the refractive optical structure 130.

As shown in FIG. 9, N=2, the refractive optical structure 130 includes two refraction portions 131 in a one-to-one correspondence with the two light emission devices 110 in the laser beam emission module 100, and the two refraction portions 131 can be prisms for receiving two outgoing beam groups obtained after two laser beam groups emitted by two light emission devices 110 are processed by the emission lens 120, so that the two outgoing laser beam groups are subjected to angle deflection after being refracted, to deflect along a vertical direction of approaching laser beam groups emitted by adjacent light emission devices 110, so that the interval between the angles of view of the two outgoing beam groups corresponding to the two light emission devices 110 is reduced to be close to or equal to an interval θ2 between angles of view of two adjacent outgoing beams 1111 in an outgoing beam group 1112 corresponding to a single light emission device 110. The two refraction portions 131 may be different regions of an integrated prism (wedge-shaped prism), or may be two prisms manufactured independently.

In an example, a VCSEL (Vertical-Cavity Surface-Emitting Laser) is used as the light emission device 110, a distance Dv between two light emission devices 110 in the same laser beam emission module 100 satisfies Dv=0.12 mm, distances D1 between light emission units 111 in the light emission device 110 satisfy D1=0.03 mm, and a focal length $f_1$ of the emission lens 120 satisfies $f_1$=3.658 mm. After being processed by the emission lens 120, an outgoing beam of each light emission device 110 that is closest to a central field-of-view region has an angle of view of 0.9398°, an interval between the fields of view corresponding to the two light emission devices 110 is 1.8796°, and an interval between angles of view of two adjacent light emission units in each light emission device 110 is equal to 0.47°. A wedge-shaped prism is added behind a position that is on the light outgoing side of the emission lens 120 and at which separation of the two outgoing beam groups starts. Herein, a front surface of the prism is tilted by 1.37° and a rear surface is tilted by 0°, and therefore, an emission angle of view is deflected by 0.23° after the outgoing beam of each light emission device 110 that is closest to the central field-of-view region passes through the wedge-shaped prism. After a laser beam that is directed at 1.4098°=0.9398°+0.47° and that is adjacent to the outgoing beam closest to the central field-of-view region passes through the wedge-shaped prism, an emission angle of view is deflected by 0.7°, an interval between angles of view corresponding to two light emission devices 110 is adjusted from 1.8796° to 0.46°, an interval between angles of view of two adjacent outgoing beams in each outgoing beam group is still 0.47° (0.7° to 0.23°), thereby resolving a problem of affecting the detection effect in the entire detection field of view when a larger blind spot appears because the interval between the angles of view of the two outgoing beam groups 1112 of two corresponding light emission devices 110 is excessively large.

Further, N>2, the refractive optical structure 130 includes N refraction portions 131 in a one-to-one correspondence with the N light emission devices 110 in the laser beam emission module 100, and the N refraction portions 131 can be prisms for receiving N outgoing beam groups obtained after N laser beam groups emitted by N light emission devices 110 are processed by the emission lens 120, so that the N outgoing laser beam groups are subjected to angle deflection after being refracted, to deflect along a vertical direction of approaching laser beam groups emitted by adjacent light emission devices 110, so that the interval between the angles of view of the N outgoing beam groups corresponding to the N light emission devices 110 is reduced to be close to or equal to an interval θ2 between angles of view of two adjacent outgoing beams 1111 in an outgoing beam group 1112 corresponding to a single light emission device 110. The N refraction portions 131 may be different regions of an integrated prism, or may be N prisms manufactured independently.

When N≥2, in some embodiments, the refractive optical structure 130 includes (N−1) refraction portions arranged at intervals along the vertical direction, and the (N−1) refraction portions are in a one-to-one correspondence with laser beam groups emitted by (N−1) light emission devices 110, and are configured to receive (N−1) outgoing beam groups obtained after the (N−1) laser beam groups emitted by (N−1) light emission devices 110 are processed by the emission lens 120, so that the (N−1) outgoing beam groups are subjected to angle deflection after being refracted, to deflect along a direction of approaching a fixed outgoing beam group, where the fixed outgoing beam group is an outgoing beam group output after a laser beam group emitted by one light emission device 110 unequipped with the refraction portion correspondingly in the N light emission devices 110 is processed by the emission lens.

In some embodiments, the light beam adjustment module includes a light uniformizing structure (not shown in the figure) such as a diffuser, and the diffuser is located on a light outgoing side of the emission lens 120 and configured to uniformize all or some of the emission laser beam groups 1112 along the vertical direction that are output by the emission lens 120, to enlarge a light spot size of the outgoing beams 1111 and reduce an interval between angles of view of two outgoing beam groups 1112 corresponding to two adjacent light emission device 110.

What is claimed is:

1. A LiDAR, comprising at least one laser beam emission module and at least one laser beam receiving module, wherein each laser beam emission module comprises a light emission device and an emission lens, the emission lens is on a light outgoing side of the light emission device;

each laser beam receiving module comprises a detection device and a receiving lens, and the receiving lens is on a light incident side of the detection device; and a focal length of an emission lens of the at least one laser beam emission module is set to be less than a first focal length value, wherein a focal length of a receiving lens of the at least one laser beam receiving module is set to be less than a second focal length value;

wherein the detection device comprises multiple detection units arranged along a horizontal direction and a vertical direction, and a total receiving angle of view comprises a horizontal receiving angle of view and a vertical receiving angle of view, wherein the at least one laser beam receiving module satisfies: $f_2$<second focal length value, $f_2$ is a focal length of a receiving lens of the laser beam receiving module, $\theta_{2x}$>second horizontal preset value, $\theta_{2y}$>second vertical preset value, $\theta_{2x}$ is the horizontal receiving angle of view, and $\theta_{2y}$ is the vertical receiving angle of view;

wherein the number of laser beam receiving modules is one, and the laser beam receiving module satisfies: $f_2=(H_{2x}/\theta_{2x})=(H_{2y}/\theta_{2y})$, $\theta_{2x}=(H_{2x}/f_2)$, and $\theta_{2y}=(H_{2y}/f_2)$; or $f_2=(H_{2x}/\tan(\theta_{2x}))=(H_{2y}/\tan(\theta_{2y}))$, $\theta_{2x}=\arctan(H_{2x}/f_2)$, and $\theta_{2y}=\arctan(H_{2y}/f_2)$, wherein $H_{2x}$ is a dimension of a total detection surface of detection devices of all laser beam receiving modules along the horizontal direction, and $H_{2y}$ is a dimension of a total detection surface of detection devices of all the laser beam receiving modules along the vertical direction; and wherein the receiving lens comprises a beam narrowing assembly and a focusing assembly arranged sequentially along a receiving optical path of the laser beam receiving module, and the beam narrowing assembly has negative optical power and is configured to narrow an angle of view for receiving an echo laser beam; and the focusing assembly has positive optical power and is configured to focus an echo laser beam on the detection device that has been subjected to narrowing processing of the angle of view; and the receiving lens of the laser beam receiving module satisfies: $f_2=(f_{21}*f_{22})/(f_{21}+f_{22}-d_2)$, wherein $f_{21}$ is a focal length of the at least one lens comprised in the focusing assembly, $f_{22}$ is a focal length of the at least one lens comprised in the beam narrowing assembly, and $d_2$ is a distance between optical centers of the focusing assembly and the beam narrowing assembly.

2. The LiDAR according to claim 1, wherein the light emission device comprises multiple light emission units, the multiple light emission units are arranged along a horizontal direction and a vertical direction, and a total emission angle of view comprises a horizontal emission angle of view and a vertical emission angle of view, wherein the at least one laser beam emission module satisfies: $f_1$<first focal length value, $f_1$ is the focal length of the emission lens of the laser beam emission module, $\theta_{1x}$>first horizontal preset value, $\theta_{1y}$>first vertical preset value, and $\theta_{1x}$ and $\theta_{1y}$ are the horizontal emission angle of view and the vertical emission angle of view, respectively.

3. The LiDAR according to claim 2, wherein there are multiple laser beam emission modules, emission lenses of the multiple laser beam emission modules have the same structure, the emission lens of each laser beam emission module comprises a first optical axis, and first optical axes of the emission lenses of the multiple laser beam emission modules are parallel to each other; and when the first optical axes of emission lenses of two adjacent laser beam emission modules are aligned along the first optical axis direction, light emission surfaces of light emission devices of the two adjacent laser beam emission modules cover different regions along the horizontal direction, and the light emission surfaces of the light emission devices of the two adjacent laser beam emission modules abut on or overlap with each other along the horizontal direction, wherein the multiple laser beam emission modules satisfy: $f_1=(H_{1x}/\theta_{1x})=(H_{1y}/\theta_{1y})$, $\theta_{1x}=(H_{1x}/f_1)$, and $\theta_{1y}=(H_{1y}/f_1)$; or $f_1=(H_{1x}/\tan(\theta_{1x}))=(H_{1y}/\tan(\theta_{1y}))$, $\theta_{1x}=\arctan(H_{1x}/f_1)$, and $\theta_{1y}=\arctan(H_{1y}/f_1)$, wherein $H_{1x}$ is a dimension of a total light emission surface of the light emission devices of all the laser beam emission modules along the horizontal direction, and $H_{1y}$ is a dimension of a total light emission surface of the light emission devices of all the laser beam emission modules along the vertical direction.

4. The LiDAR according to claim 3, wherein the emission lens comprises an angle narrowing assembly and a beam expanding assembly arranged sequentially along an emission optical path of the laser beam emission module, and the angle narrowing assembly has positive optical power, comprises at least one lens, and is configured to narrow a divergence angle of a laser beam emitted by the light emission device; and the beam expanding assembly has negative optical power, comprises at least one lens, and is configured to expand an angle of view of a laser beam subjected to divergence angle narrowing processing; and the emission lenses of the multiple laser beam emission modules satisfy: $f_1=(f_{11}*f_{12})/(f_{11}+f_{12}-d_1)$, wherein $f_{11}$ is a focal length of the at least one lens comprised in the angle narrowing assembly, $f_{12}$ is a focal length of the at least one lens comprised in the beam expanding assembly, and $d_1$ is a distance between optical centers of the angle narrowing assembly and the beam expanding assembly.

5. The LiDAR according to claim 1, wherein there are multiple laser beam emission modules and one laser beam receiving module; and the multiple laser beam emission modules are arranged on two sides of the laser beam receiving module, or the multiple laser beam emission modules are arranged around the laser beam receiving module; and a combined emission field of view of the multiple laser beam emission modules matches a receiving field of view of the laser beam receiving module.

6. The LiDAR according to claim 5, wherein there are multiple laser beam emission modules, the multiple laser beam emission modules are arranged on two sides of the laser beam receiving module along a horizontal direction, and outgoing beams emitted by at least two laser beam emission modules are directed to different detection regions along the horizontal direction.

7. The LiDAR according to claim 5, wherein each laser beam emission module comprises multiple light emission devices arranged in a vertical direction, and the multiple light emission devices corresponding to each laser beam emission module cover different regions along the vertical direction.

8. A LiDAR design method, comprising designing a laser beam emission module, wherein the designing the laser beam emission module comprises:

selecting a light emission device based on a required total emission angle of view; and setting a focal length of at least one emission lens to be less than a first focal length value based on the required total emission angle of view and the selected light emission device, wherein a focal length of a receiving lens of the at least one laser beam receiving module is set to be less than a second focal length value;

wherein the detection device comprises multiple detection units arranged along a horizontal direction and a vertical direction, and a total receiving angle of view comprises a horizontal receiving angle of view and a vertical receiving angle of view, wherein the at least one laser beam receiving module satisfies: $f_2$<second focal length value, $f_2$ is a focal length of a receiving lens of the laser beam receiving module, $\theta_{2x}$>second horizontal preset value, $\theta_{2y}$>second vertical preset value, $\theta_{2x}$ is the horizontal receiving angle of view, and $\theta_{2y}$ is the vertical receiving angle of view;

wherein the number of laser beam receiving modules is one, and the laser beam receiving module satisfies: $f_2=(H_{2x}/\theta_{2x})=(H_{2y}/\theta_{2y})$, $\theta_{2x}=(H_{2x}/f_2)$, and $\theta_{2y}=(H_{2y}/f_2)$; or $f_2=(H_{2x}/\tan(\theta_{2x}))=(H_{2y}/\tan(\theta_{2y}))$, $\theta_{2x}=\arctan(H_{2x}/f_2)$, and $\theta_{2y}=\arctan(H_{2y}/f_2)$, wherein $H_{2x}$ is a dimension of a total detection surface of detection devices of all laser beam receiving modules along the horizontal direction, and $H_{2y}$ is a dimension of a total detection surface of detection devices of all the laser beam receiving modules along the vertical direction; and wherein the receiving lens comprises a beam narrowing assembly and a focusing assembly arranged sequentially along a receiving optical path of the laser beam receiving module, and the beam narrowing assembly has negative optical power and is configured to narrow an angle of view for receiving an echo laser beam; and the focusing assembly has positive optical power and is configured to focus an echo laser beam on the detection device that has been subjected to narrowing processing of the angle of view; and the receiving lens of the laser beam receiving module satisfies: $f_2=(f_{21}*f_{22})/(f_{21}+f_{22}-d_2)$, wherein $f_{21}$ is a focal length of the at least one lens comprised in the focusing assembly, $f_{22}$ is a focal length of the at least one lens comprised in the beam narrowing assembly, and $d_2$ is a distance between optical centers of the focusing assembly and the beam narrowing assembly.

9. The LiDAR design method according to claim 8, further comprising designing a laser beam receiving module, wherein the designing the laser beam receiving module comprises:

selecting a detection device based on a required total receiving angle of view; and setting a focal length of at least one receiving lens to be less than a second focal length value based on the required total receiving angle of view and the selected light detection device.

* * * * *